US007923162B2

(12) United States Patent
Vanderwees

(10) Patent No.: US 7,923,162 B2
(45) Date of Patent: Apr. 12, 2011

(54) FUEL CELL ASSEMBLIES WITH INTEGRATED REACTANT-CONDITIONING HEAT EXCHANGERS

(75) Inventor: Doug Vanderwees, Mississauga (CA)

(73) Assignee: Dana Canada Corporation, Ontario (CA)

(*) Notice: Subject to any disclaimer, the term of this patent is extended or adjusted under 35 U.S.C. 154(b) by 653 days.

(21) Appl. No.: 12/051,402

(22) Filed: Mar. 19, 2008

(65) Prior Publication Data

US 2009/0239112 A1 Sep. 24, 2009

(51) Int. Cl.
*H01M 8/04* (2006.01)

(52) U.S. Cl. ........ 429/434; 429/436; 429/457; 429/458; 429/460; 429/514; 429/440

(58) Field of Classification Search .................. 429/457, 429/458, 434, 436, 460, 514, 440, 452, 443, 429/469
See application file for complete search history.

(56) References Cited

U.S. PATENT DOCUMENTS

| | | | |
|---|---|---|---|
| 5,132,174 A | 7/1992 | Romanowski et al. | |
| 5,270,127 A | 12/1993 | Koga et al. | |
| 6,632,555 B2 | 10/2003 | Ding | |
| 6,667,122 B2 | 12/2003 | Kaufmann | |
| 6,686,080 B2 | 2/2004 | Farkash et al. | |
| 6,759,153 B1 | 7/2004 | Lamm et al. | |
| 6,805,846 B2 | 10/2004 | Phillips | |
| 6,948,559 B2* | 9/2005 | Reinke et al. .................. 165/140 |
| 7,001,682 B2* | 2/2006 | Haltiner, Jr. .................. 429/440 |
| 7,041,406 B2 | 5/2006 | Schuler et al. | |
| 7,070,874 B2* | 7/2006 | Blanchet et al. | |
| 7,097,925 B2* | 8/2006 | Keefer ............................... 429/9 |
| 7,226,680 B2* | 6/2007 | Wexel et al. | |
| 7,226,682 B2 | 6/2007 | Tachtler et al. | |
| 7,368,196 B2* | 5/2008 | Wexel et al. .................. 429/441 |
| 2004/0076862 A1* | 4/2004 | Bruck et al. | |
| 2004/0081874 A1* | 4/2004 | Tachtler et al. | |
| 2005/0014046 A1* | 1/2005 | Tachtler et al. | |

FOREIGN PATENT DOCUMENTS

EP 1371104 B1 11/2005
FR 2837025 A1 * 9/2003

* cited by examiner

*Primary Examiner* — Raymond Alejandro
(74) *Attorney, Agent, or Firm* — Ridout & Maybee LLP

(57) ABSTRACT

A fuel cell assembly in which at least one heat exchanger for conditioning either the anode or cathode reactant gas is integrated with the fuel cell stack and located at the end of the fuel cell stack, to isolate the fuel cell stack from contact with the end plates of the stack. The heat exchanger may preferably be comprised of a stack of plates which may preferably be the same as the plates as the fuel cell stack, with outer and inner end plates to direct the flow of reactant gases, waste gases and coolant to and from the fuel cell stack. The assembly is preferably configured to include reactant conditioning heat exchangers at both ends of the fuel cell stack.

15 Claims, 16 Drawing Sheets

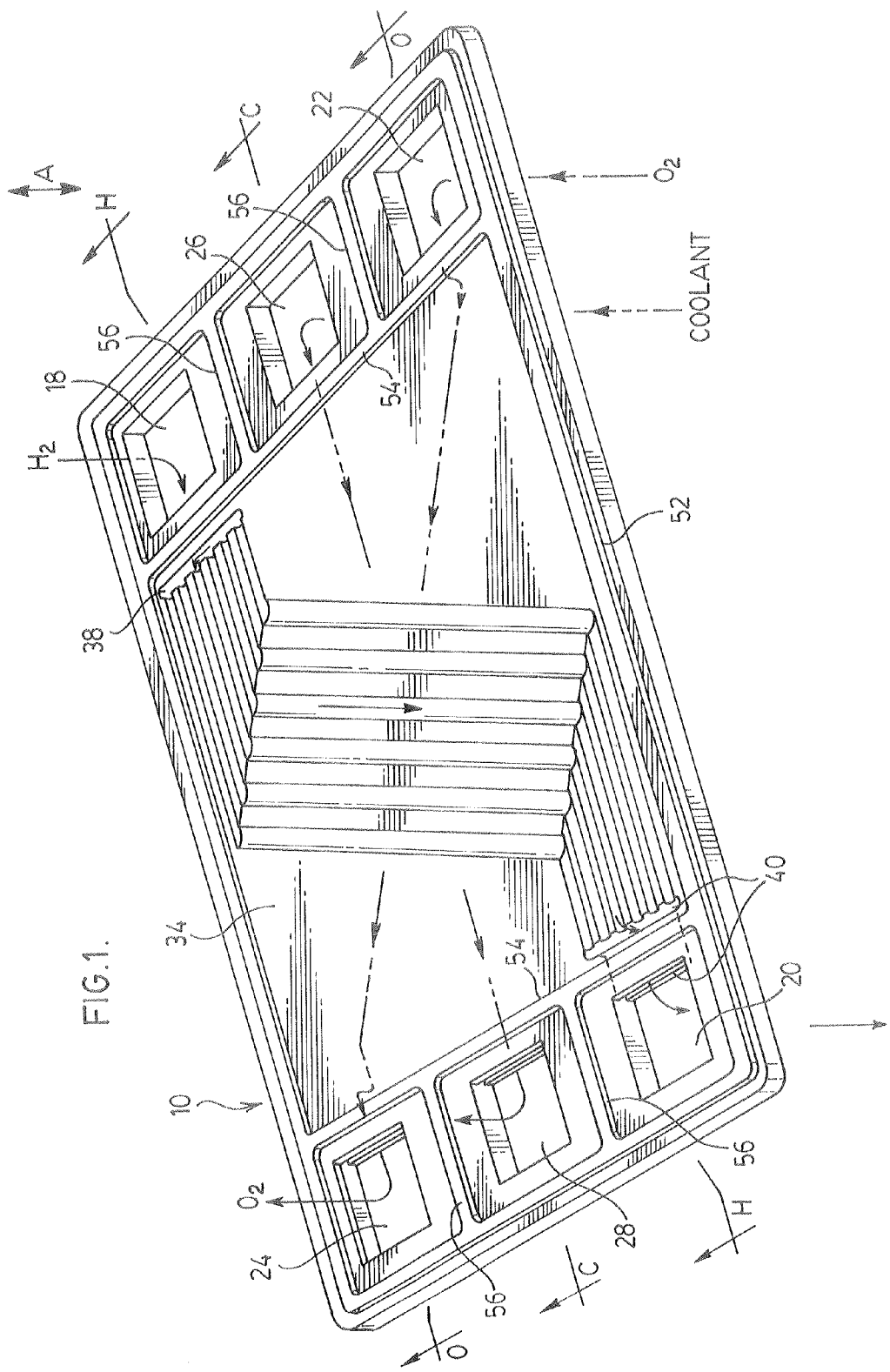

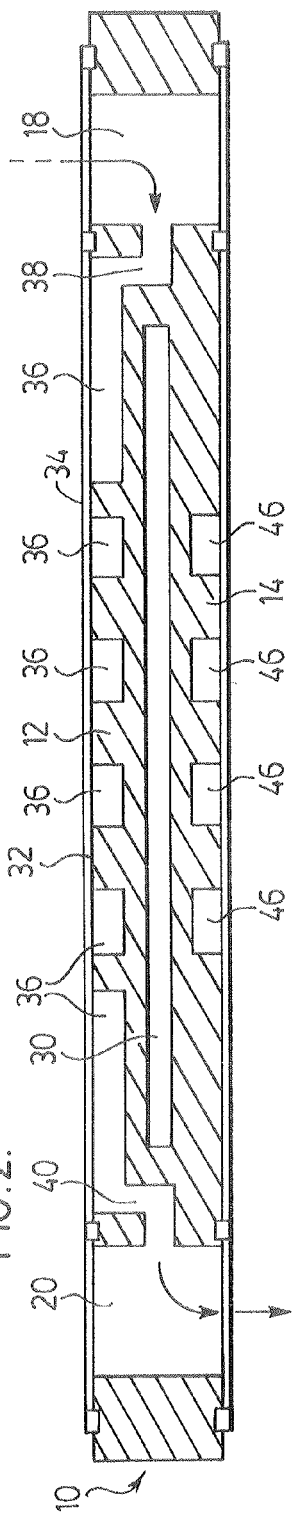
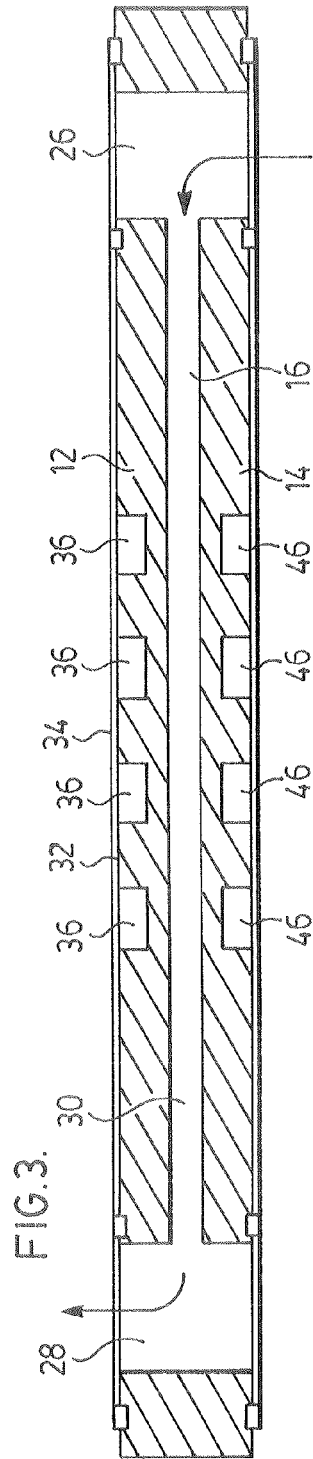
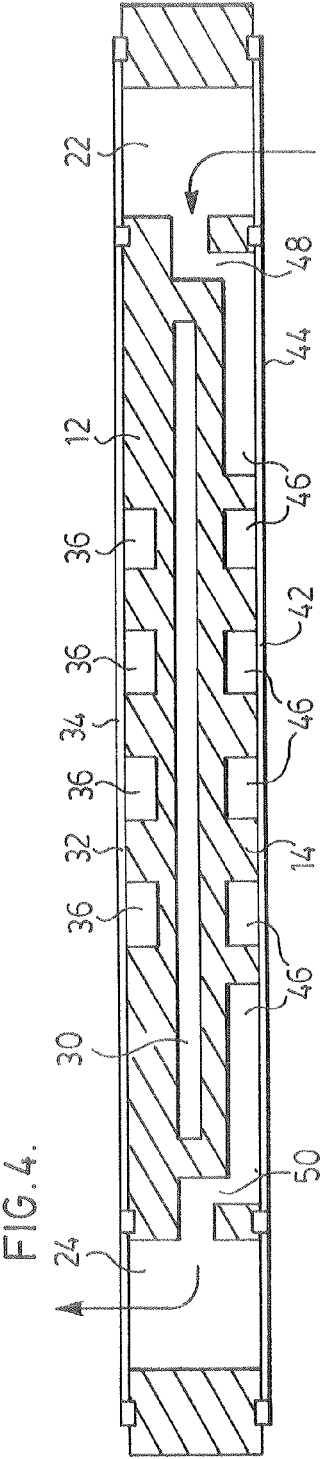

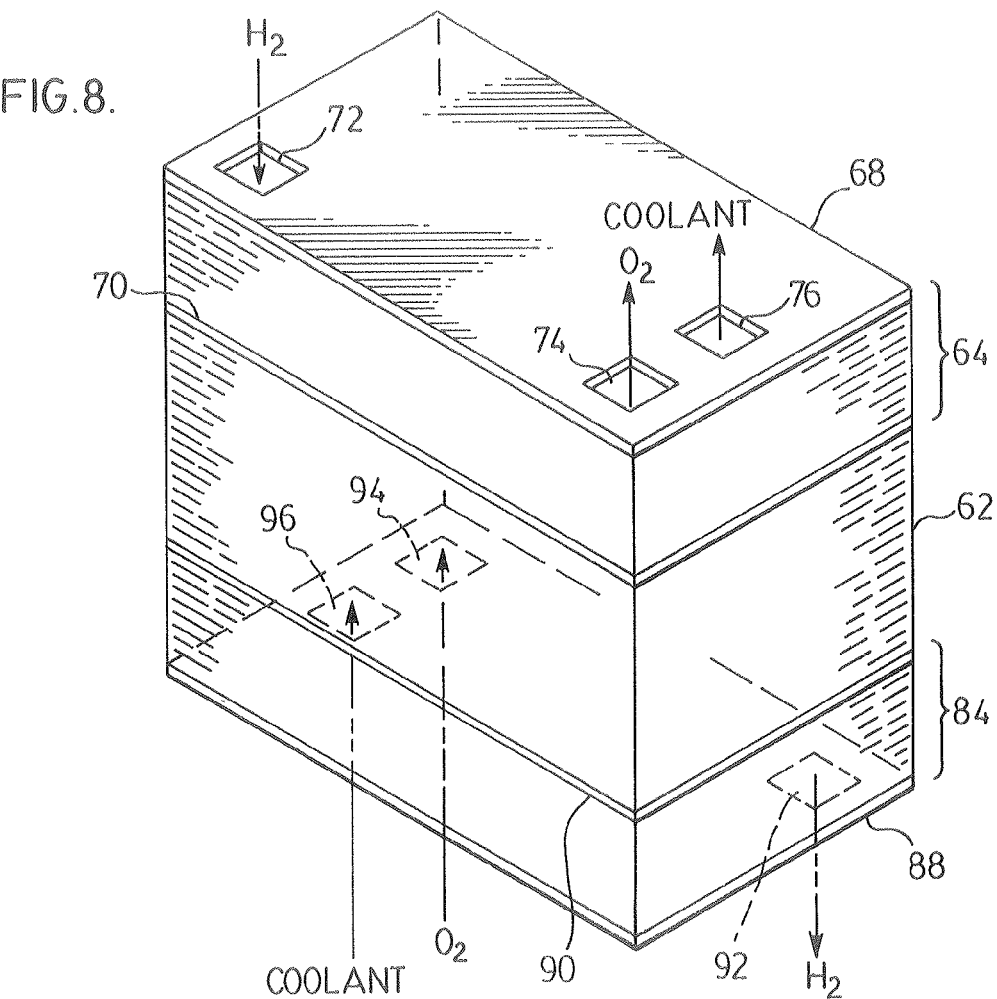
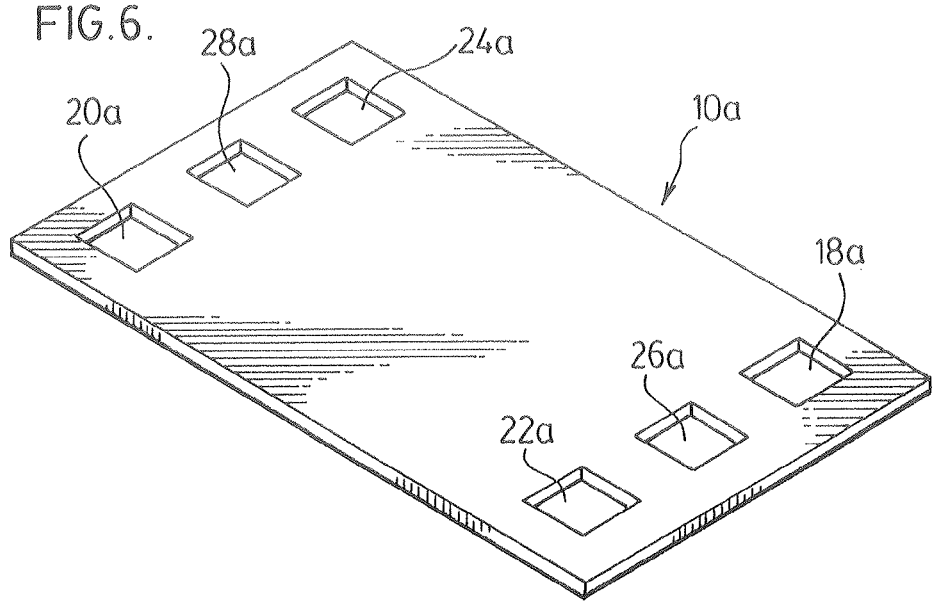

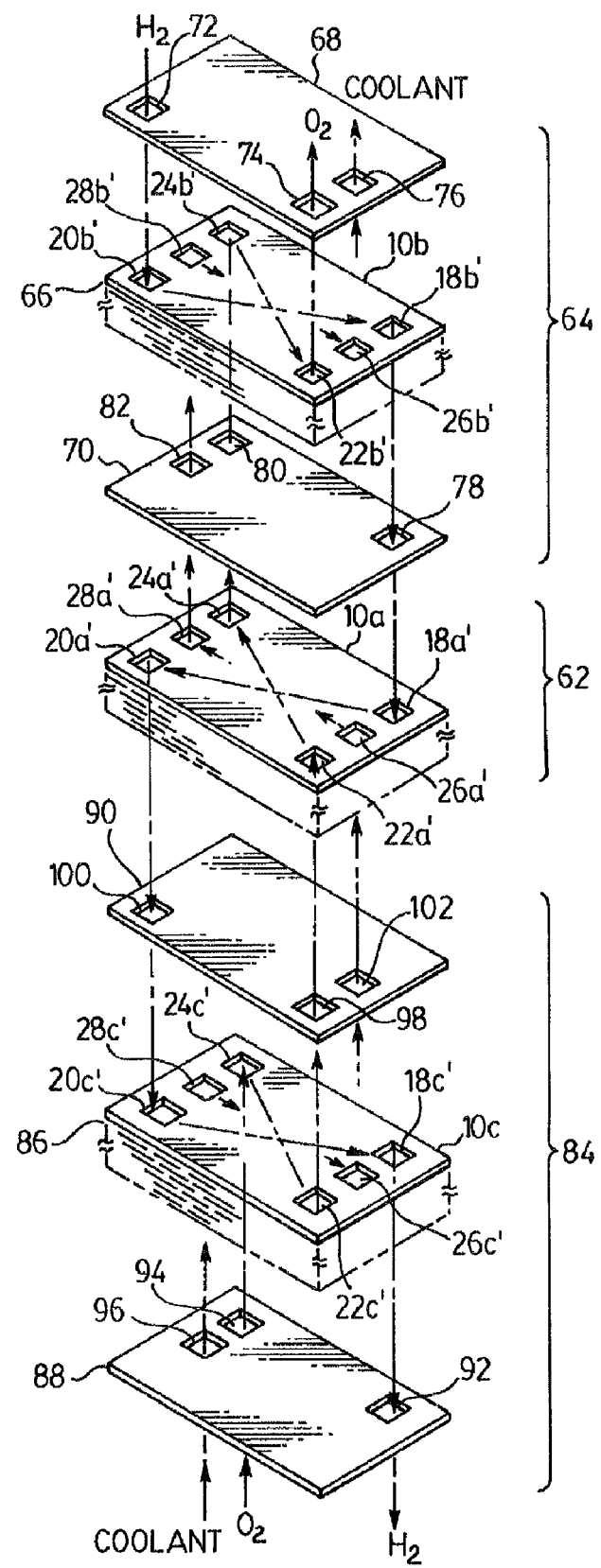

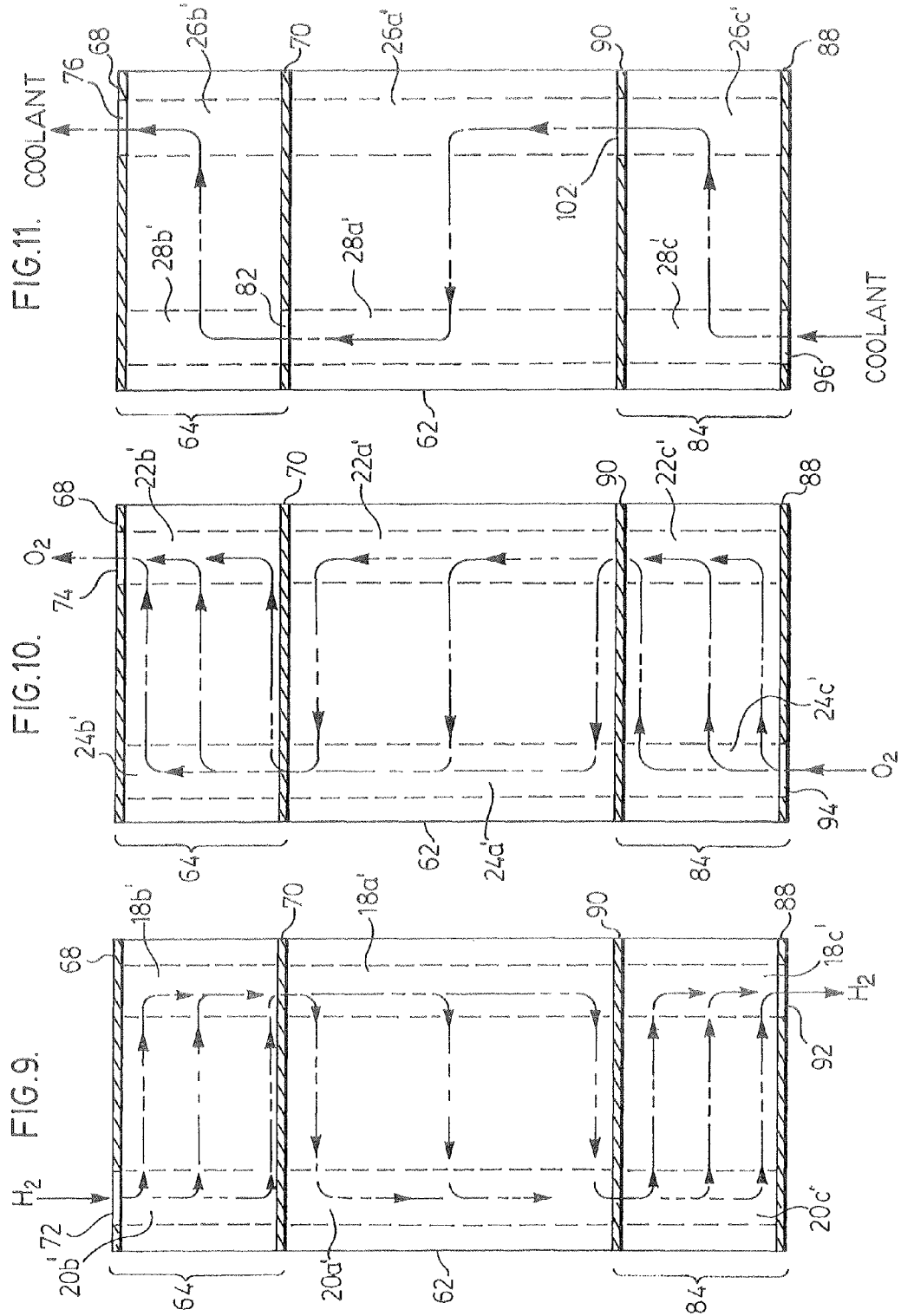

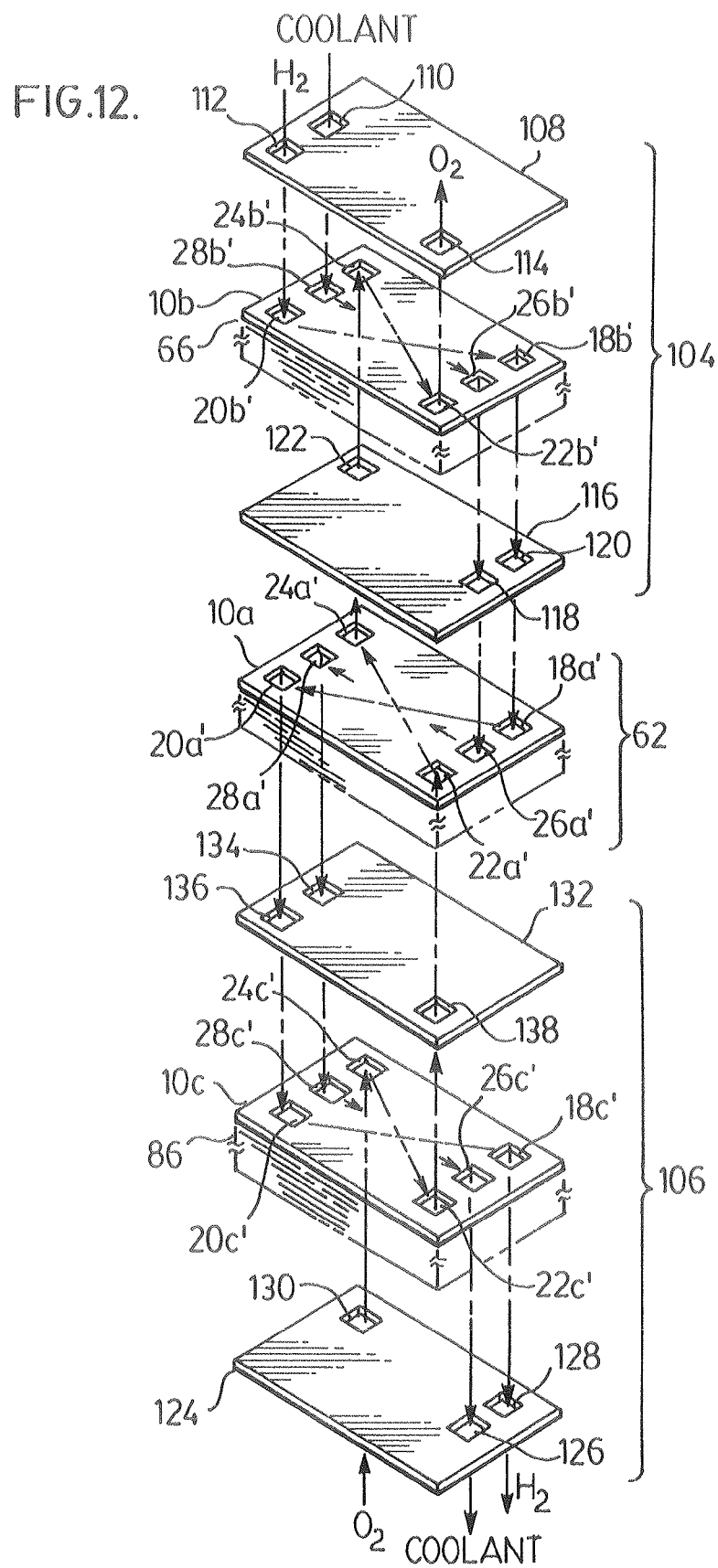

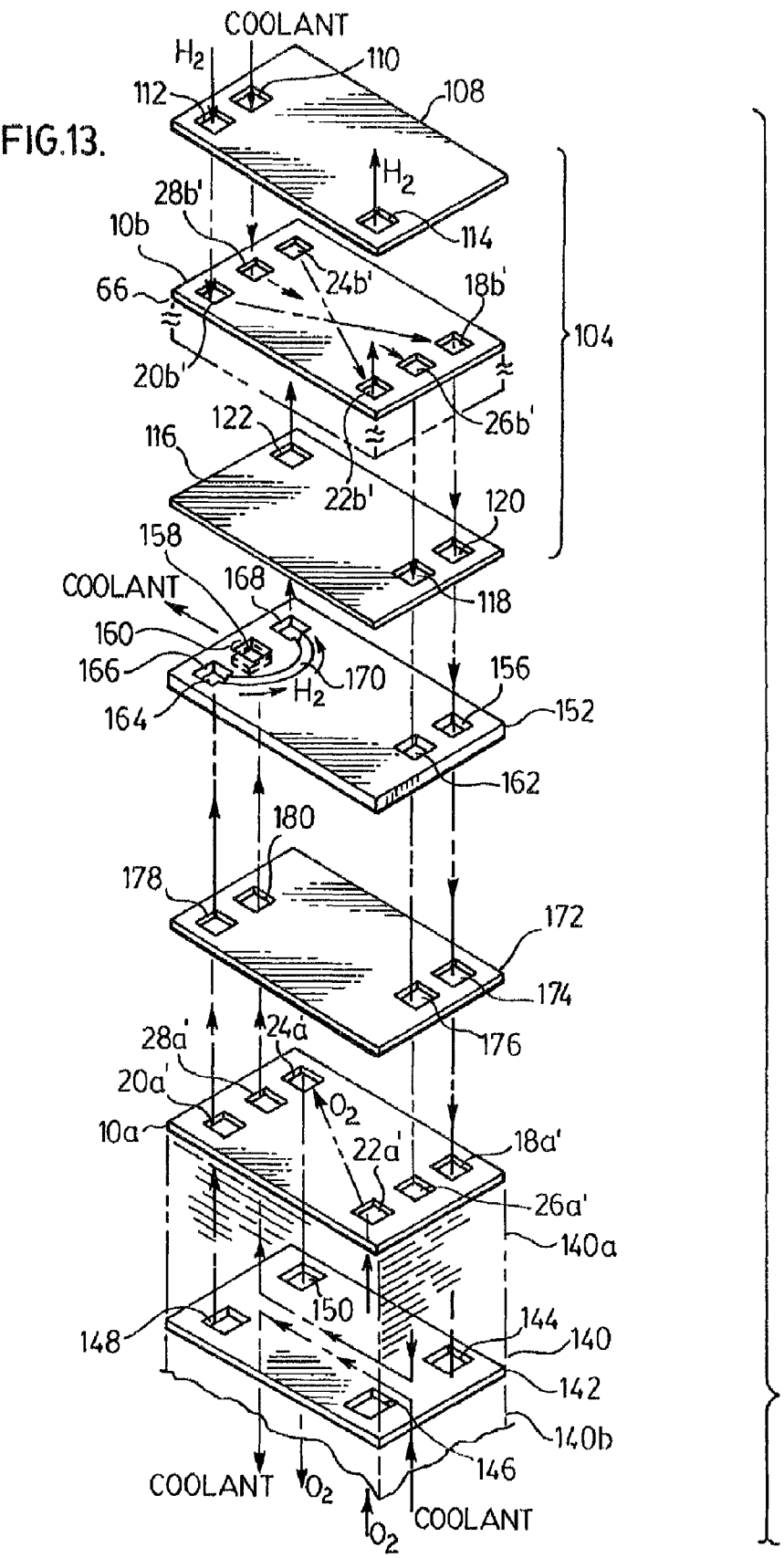

FUEL CELL ASSEMBLIES WITH INTEGRATED REACTANT-CONDITIONING HEAT EXCHANGERS

FIELD OF THE INVENTION

The invention relates to fuel cell assemblies incorporating heat exchangers to condition one or both of the anode and cathode reactant gases, and more specifically relates to fuel cell assemblies in which the reactant conditioning heat exchangers are structurally and functionally integrated with the fuel cell stack.

BACKGROUND OF THE INVENTION

Fuel cells are typically in the form of stacks of plates sandwiched between a pair of end plates. In a typical fuel cell, hydrogen or a hydrogen-rich gas stream is fed to the fuel cell anode and oxygen or air is fed to the fuel cell cathode. Prior to being introduced to the fuel cell stack these reactants are preferably cooled or heated to the fuel cell operating temperature by one or more heat exchangers. The heat exchangers and the fuel cell stack are typically separate components connected together by conduits. The use of separately formed heat exchangers can be problematic where space is limited and may add to complication and cost of the fuel cell system.

The fuel cell stack must be maintained within a narrow temperature range in order to operate efficiently. The end plates, however, are in contact with both the ambient surroundings and with the fuel cell plates at the top and bottom of the fuel cell stack. Thus, the fuel cell plates which are in close proximity to the end plates can be at a temperature which is different from the optimum temperature of the central portions of the stack, resulting in lost efficiency.

SUMMARY OF THE INVENTION

The invention provides a fuel cell assembly comprising a fuel cell stack and a first heat exchanger, wherein a first reactant gas and a second reactant gas are reacted in said fuel cell stack to generate electrical energy and to produce a first waste gas and a second waste gas. The fuel cell assembly is comprised of a plurality of plates having a first plate wall and an opposed second plate wall which are spaced apart to define a hollow interior. Each of the plates has three pairs of inlet and outlet openings, including a coolant inlet opening and a coolant outlet opening which are in flow communication with one another through a coolant flow passage provided in the hollow interior of the plate.

The fuel cell stack comprises a first stack of said plates in which said inlet and outlet openings further include a first reactant gas inlet opening, a first waste gas outlet opening, a second reactant gas inlet opening and a second waste gas outlet opening. The plates are arranged in the first stack with their inlet and outlet openings aligned to form a plurality of corresponding, axially extending manifolds, including a first reactant gas inlet manifold, a first waste gas outlet manifold, a second reactant gas inlet manifold, a second waste gas outlet manifold, a coolant inlet manifold and a coolant outlet manifold. Adjacent pairs of said plates in the first stack are sealed to one another about their peripheries with electrolytic membranes provided between said adjacent plates, such that a first gas flow passage is defined between an outer surface of the first plate wall of each plate and one of said membranes and a second gas flow passage is defined between an outer surface of the second plate wall each plate and another one of said membranes, such that the first reactant gas inlet manifold and the first waste gas outlet manifold are in flow communication with one another through said first gas flow passages, and the second reactant gas inlet manifold and the second waste gas outlet manifold are in flow communication with one another through said second gas flow passages, and such that the first and second gas flow passages throughout the first stack are in reactive communication with one another through said electrolytic membranes.

The first heat exchanger is located at a first end of the fuel cell stack and comprises a second stack of said plates and a pair of end plates. In the second stack of said plates, said inlet and outlet openings further include a first reactant gas inlet opening, a first reactant gas outlet opening, a waste gas inlet opening and a waste gas outlet opening for either the first or second waste gas. The plates are arranged in the second stack with their inlet and outlet openings aligned to form a plurality of corresponding, axially extending manifolds, including a first reactant gas inlet manifold, a first reactant gas outlet manifold, a waste gas inlet manifold, a waste gas outlet manifold, a coolant inlet manifold and a coolant outlet manifold. Adjacent pairs of said plates in the second stack are sealed to one another about their peripheries with heat transmissive partitions provided between said adjacent plates, wherein a first gas flow passage is defined between an outer surface of the first plate wall of each plate and one of said partitions and a second gas flow passage is defined between an outer surface of the second plate wall of each plate and another one of said partitions, such that the first reactant gas inlet and outlet manifolds are in flow communication with one another through said first gas flow passages, and the waste gas inlet and outlet openings are in flow communication with one another through said second gas flow passages, and such that the first and second gas flow passages throughout the second stack are in heat transfer communication with one another through said partitions.

The outer end plate is provided at an outer end of the second stack, distal to the first stack, and has a first reactant gas opening in flow communication with the first reactant gas inlet manifold of the second stack, a waste gas opening in flow communication with the waste gas outlet manifold of the second stack, and a coolant opening in flow communication with either the coolant inlet or outlet manifold of the second stack, wherein the outer end plate seals an outer end of each of the waste gas inlet manifold, the first reactant gas outlet manifold and another of the coolant manifolds of the second stack.

The inner end plate is provided at an inner end of the second stack and is interposed between the first and second stacks. The inner end plate has a first reactant gas opening providing flow communication between the first reactant gas outlet manifold of the second stack and the first reactant gas inlet manifold of the first stack, a waste gas opening providing flow communication between the waste gas inlet manifold of the second stack and either the first or second waste gas outlet manifold of the first stack, and a coolant opening providing flow communication either between the coolant inlet manifold of the first stack and the coolant outlet manifold of the second stack or between the coolant outlet manifold of the first stack and the coolant inlet manifold of the second stack; and wherein the inner end plate seals an inner end of each of the waste gas outlet manifold, the first reactant gas inlet manifold and one of the coolant manifolds of the second stack.

BRIEF DESCRIPTION OF THE DRAWINGS

The invention will now be described, by way of example only, with reference to the accompanying drawings, in which:

FIG. 1 is a top perspective view of a fuel cell plate for use in the present invention;

FIG. 2 is a cross section along line H-H of FIG. 1;

FIG. 3 is a cross section along line C-C of FIG. 1;

FIG. 4 is a cross section along line O-O of FIG. 1;

FIG. 6 is a schematic, simplified view of a fuel cell plate for use in the present invention;

FIG. 7 is a schematic, exploded view of a fuel cell assembly according to a first embodiment of the present invention, including a pair of reactant-conditioning heat exchangers;

FIG. 8 is schematic, perspective view of the fuel cell assembly of FIG. 7, shown in its assembled state;

FIG. 9 is a cross section through the fuel cell assembly of FIG. 7, illustrating the anode gas (hydrogen) flow path;

FIG. 10 is a cross section through the fuel cell assembly of FIG. 7, showing the cathode gas (oxygen) flow path;

FIG. 11 is a cross section through the fuel cell assembly of FIG. 7, showing the coolant flow path;

FIG. 12 is a schematic, exploded view of a fuel cell assembly according to a variant of the first embodiment;

DETAILED DESCRIPTION OF PREFERRED EMBODIMENTS

Figure 5:
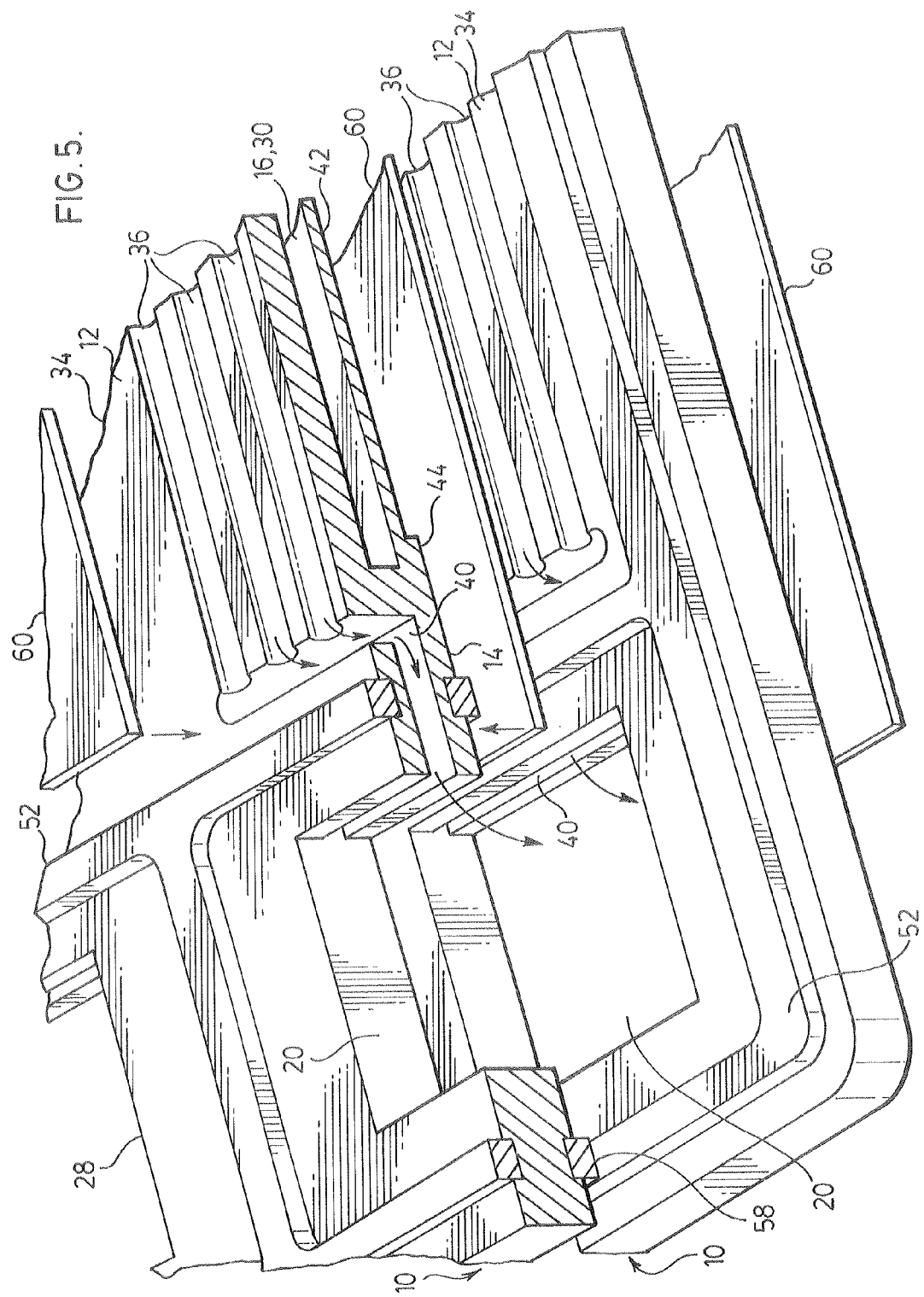
FIG. 5 is an exploded perspective view, partly in cross section, showing a portion of a stack of plates for use in the present invention.

Fuel cell assemblies according to the invention comprise a fuel cell stack and at least one reactant-conditioning heat exchanger which is structurally and functionally integrated with the fuel cell stack. A first reactant gas and a second reactant gas are reacted in the fuel cell stack to generate electrical energy. The reaction of the gases also produces waste heat, water and waste gases as by-products. Each reactant-conditioning heat exchanger transfers heat among a hot waste gas, a relatively cool reactant gas, and a liquid coolant.

One of the gases which flows through the fuel cell assembly is the anode gas, also generally referred to herein as the hydrogen-containing gas or simply as $H_2$ in the drawings. The anode gas entering the fuel cell assembly is relatively rich in hydrogen, and is referred to herein as the anode reactant gas. The anode gas becomes partially depleted in hydrogen as it flows through the fuel cell stack, and the anode gas in its depleted state is referred to herein as the anode waste gas.

The other gas which flows through the fuel cell assembly is the cathode gas, also generally referred to herein as the oxygen-containing gas or simply as $O_2$ in the drawings. The cathode gas entering the fuel cell assembly is relatively rich in oxygen, and is referred to herein as the cathode reactant gas. The cathode gas becomes partially depleted in oxygen as it flows through the fuel cell stack, and the cathode gas in its depleted state is referred to herein as the cathode waste gas. It will be appreciated that the cathode reactant gas may preferably comprise air.

The liquid coolant may preferably comprise deionized water, optionally in combination with a glycol coolant, or a coolant fluid oil. As will be appreciated, the coolant absorbs heat generated by the reaction of the anode reactant gas and the cathode reactant gas, thereby becoming heated as it flows through the fuel cell stack.

The fuel cell assemblies according to the invention are comprised of a plurality of fuel cell plates 10, which are now described with reference to FIGS. 1 to 5. Fuel cell plate 10 comprises a first plate wall 12 and an opposed second plate wall 14 which are spaced apart along an axis A to define a hollow interior 16 (FIGS. 2 to 4). Plate 10 has three pairs of inlet and outlet openings which are described below in the context of a fuel cell stack 62 made up of a stack of said plates 10.

Each plate 10 includes an anode reactant gas inlet opening 18, a diagonally opposed anode waste gas outlet opening 20, a cathode reactant gas inlet opening 22, a diagonally opposed cathode waste gas outlet opening 24, a coolant inlet opening 26 and a directly opposed coolant outlet opening 28. Although the inlet and outlet openings for the reactant and waste gases in the plates described herein are diagonally opposed, it will be appreciated that this is not essential. For example, the plates may be configured so that inlet and outlet openings are directly opposite to one another, and other types of arrangements are also possible.

The plate 10 also defines a plurality of flow passages, each of which extends between a pair of inlet and outlet openings. As shown in FIG. 3, the coolant inlet opening 26 and the coolant outlet opening 28 are in flow communication with one another through a coolant flow passage 30 provided in the hollow interior 16 of plate 10. Similarly, the anode reactant gas inlet opening 18 is in flow communication with the anode waste gas outlet opening 20 through an anode gas flow passage 32 which is provided along an outer surface 34 of the first plate wall 12. As shown in the drawings, the anode gas flow passage 32 is defined by a plurality of grooves 36 formed in the outer surface 34 of first plate wall 12, only some of which are shown in FIG. 1. Grooves 36 extend between the diagonally opposed inlet and outlet openings 18, 20. The grooves 36 are formed in a central portion of the first plate wall 12 which is spaced from the inlet and outlet openings 18 and 20, and are in flow communication with openings 18, 20 through a pair of open-ended channels 38, 40. Channel 40 is best seen in FIG. 5.

Channel 38 (best seen in FIGS. 1 and 2) provides flow communication between the anode reactant gas inlet opening 18 and the grooves 36 through a narrow slot provided in the axial side wall of inlet opening 18 and a narrow slot provided in the outer surface 34 of first plate wall 12. Similarly, channel 40 extends between the anode waste gas outlet opening 20 and grooves 36. The channel 40 communicates with the outlet opening 20 through a narrow slot provided in the axial side wall of opening 20, and a narrow slot provided in the outer surface 34 of first plate wall 12. This is best seen in FIGS. 2 and 5.

A cathode gas flow passage 42 is provided on the outer surface 44 of the second plate wall 14, and is best seen in FIGS. 4 and 5. The structure of the cathode gas flow passage 42 is substantially identical to the structure of the anode gas flow passage 32 described above. In particular, the cathode gas flow passage is made up of a plurality of grooves 46 formed in the outer surface 44 of the second plate wall 14 and extending across a central portion of the outer surface 44 from the cathode reactant gas inlet opening 22 to the diagonally opposed cathode waste gas outlet opening 24. A channel 48 provides flow communication between an axial side wall of inlet opening 22 and grooves 46, and a channel 50 provides flow communication between an axial side wall of outlet opening 24 and grooves 46.

As shown in FIG. 1, the outer surface 34 of the first plate wall 12 is provided with a resilient gasket 52 which extends around the outer periphery of plate 10, and which includes intermediate members 54 which separate the central plate portion from the end portions in which the inlet and outlet openings are provided, as well as intermediate members 56 located between the adjacent inlet and outlet openings. An identical gasket 58 is also provided on the outer surface 44 of the second plate wall 14. It will be appreciated that gaskets 52, 58 do not necessarily form part of the plate 10. Rather, they may be separately formed or may be attached to the partition members 60, described below, which are provided between adjacent plates 10.

In the fuel cell assemblies according to the invention, a plurality of plates 10 are arranged in a fuel cell stack with their inlet and outlet openings aligned as shown in FIG. 5 to form a plurality of corresponding, axially extending manifolds. The gaskets 52, 58 provide seals between adjacent plates in the stack, and the intermediate members 54, 56 of the gaskets 52, 58 provide seals between adjacent manifolds and also provide seals between the manifolds and the central plate portions along which the anode and cathode gases flow through passages 32, 42.

Direct flow communication between the anode gas flow passage 32 of one plate 10 and the cathode gas flow passage 42 of an adjacent plate 10 is prevented by a partition member 60 which is received between the central portions of the adjacent plates 10 and is sealed between the gaskets 58 of the adjacent plates 10. FIG. 5 illustrates partition members 60 positioned between adjacent plates 10.

The first embodiment of the invention is further described below with reference to FIGS. 5 to 11. The fuel cell assembly according to the first preferred embodiment of the invention includes a plurality of stacks made up of plates 10. For the purpose of simplification, FIGS. 6 to 11 omit all details of plates 10 with the exception of the inlet and outlet openings 18, 20, 22, 24, 26 and 28 and the corresponding manifolds.

As shown in FIG. 7, the fuel cell assembly includes a fuel cell stack 62 comprised a first plurality of plates 10. The identities of the inlet and outlet openings of the plates 10 in the fuel cell stack are as described above with reference to FIGS. 1 to 5. For the purpose of distinguishing the plates 10 of fuel cell stack 62 from other plates of the fuel cell assembly, they are referred to in the following description, and in FIGS. 6 to 11, by reference 10*a* and their openings are referred to as 18*a*, 20*a*, 22*a*, 24*a*, 26*a* and 28*a*.

The plates 10*a* of fuel cell stack 62 are stacked with their inlet and outlet openings aligned to form a plurality of corresponding, axially extending manifolds. Accordingly, the anode reactant gas inlet openings 18*a* of plates 10*a* are aligned to form a corresponding anode reactant gas inlet manifold 18*a*'; the anode waste gas outlet openings 20*a* are aligned to form a corresponding anode waste gas outlet manifold 20*a*'; the cathode reactant gas inlet openings 22*a* are aligned to form a corresponding cathode reactant gas inlet manifold 22*a*'; the cathode waste gas outlet openings 24*a* are aligned to form a corresponding cathode waste gas outlet manifold 24*a*'; the coolant inlet openings 26*a* are aligned to form a corresponding coolant inlet manifold 26*a*'; and the coolant outlet openings 28*a* are aligned to form a corresponding coolant outlet manifold 28*a*'.

As will be appreciated, the anode reactant gas inlet manifold 18*a*' and the anode waste gas outlet manifold 20*a*' are in flow communication with one another through the plurality of anode gas flow passages 32 of the stacked plates 10*a*; the cathode reactant gas manifold 22*a*' and the cathode waste gas outlet manifold 24*a*' are in flow communication with one another through the plurality of cathode gas flow passages 42 of plates 10*a*; and the coolant inlet and outlet manifolds 26*a*', 28*a*' are in flow communication with one another through the plurality of coolant flow passages 30 of plates 10*a*.

In the fuel cell stack 62, the partition members 60 separating the anode and cathode gas flow passages 32, 42 are in the form of electrolytic membranes. During operation of fuel cell stack, protons from hydrogen flowing through anode gas flow passage 32 are drawn through the electrolytic membrane to the cathode gas flow passage and react with oxygen to produce water. Electrons liberated by this reaction travel through an external circuit to form an electric current. The electrolytic membrane may comprise a membrane electrode assembly which comprises an ion exchange membrane or solid polymer electrolyte disposed between two electrodes, with a layer of catalyst at the membrane/electrode interfaces to induce the desired electrochemical reaction.

In operation, the anode reactant gas and the cathode reactant gas enter the fuel cell stack 62 through respective manifolds 18*a*', 22*a*' and flow through the respective anode and cathode gas flow passages 32, 42. As they flow through the passages 32, 42, the anode gas and the cathode gas are in reactive communication with one another through the electrolytic membranes comprising partition members 60. The hydrogen and oxygen in the reactant gases are reacted to produce electricity (electrons), water and waste heat. The water is in gaseous form and is present in the anode and cathode waste gases which are produced by the reaction and which enter the respective anode waste gas outlet manifold 20*a*' and the cathode waste gas outlet manifold 24*a*'. From the respective manifolds 20*a*', 24*a*', the relatively hot waste gases leave the fuel cell stack 62.

The fuel cell assembly according to first preferred embodiment further comprises a first reactant-conditioning heat exchanger 64 which, in the first embodiment of the invention, is an anode reactant gas conditioning heat exchanger for heating and optionally humidifying the hydrogen-containing anode reactant gas before it enters the anode reactant gas inlet manifold 18*a*' of the fuel cell stack 62. It will, however, be appreciated that the first heat exchanger 64 may instead comprise a cathode reactant gas conditioning heat exchanger for heating and optionally humidifying the cathode reactant gas before it enters the cathode reactant gas inlet manifold 22*a*' of fuel cell stack 62.

The first heat exchanger 64 is comprised of a second stack 66 of plates 10. For the purpose of distinguishing the plates 10 of first heat exchanger 64 from other plates of the fuel cell assembly, they are referred to in the following description, and in the drawings, by reference 10*b*. The openings of plates 10*b* are referred to as 18*b*, 20*b*, 22*b*, 24*b*, 26*b* and 28*b*, and the corresponding manifolds are referred to as 18*b*', 20*b*', 22*b*', 24*b*', 26*b*' and 28*b*'. As more fully explained below, the naming of the openings and manifolds of plates 10*b* of the first heat exchanger 64 differs from that of plates 10*a* of the fuel cell stack 62.

The first heat exchanger 64 also comprises a pair of end plates 68, 70 between which the second stack 66 of plates 10*b* is sandwiched. Outer end plate 68 is provided at an outer end of the second stack 66 of plates 10, distal to the fuel cell stack 62, and inner end plate 70 is provided at an inner end of the second stack 66, between the second stack 66 and the fuel cell stack 62. The outer and inner end plates 68, 70 are distinguishable from the plates 10 described above, both in terms of the number and location of the inlet and outlet openings, and also in terms of structure. Specifically, the end plates 68, 70 are preferably flat, apertured plates without internal or external flow passages, each having three openings as further described below. The end plates 68, 70 have perimeters which closely follow those of the plates 10*a*, 10*b* making up the fuel cell stack 62 and the first heat exchanger 64.

The plates 10*b* forming the first heat exchanger 64 are preferably identical in structure to the plates 10 and 10*a* described above. However, due to the fact that the primary purpose of heat exchanger 64 is to condition the anode gas before it enters the fuel cell stack 62, the functions of the openings and manifolds in the first heat exchanger 64 differ somewhat from those of fuel cell stack 62. Accordingly, the names of the various openings, manifolds and flow passages of plates 10*b* in stack 66 differ somewhat from plates 10*a* making up fuel cell stack 62. The plates 10*b* and stack 66 of heat exchanger 64 include the following: anode reactant gas inlet openings 20*b* and a corresponding manifold 20*b*' which are in flow communication with anode reactant gas outlet openings 18*b* and a corresponding manifold 18*b*' through a plurality of anode reactant gas flow passages 32*b* (not shown); cathode waste gas inlet openings 24*b* and a corresponding manifold 24*b*' which are in flow communication with the cathode waste gas outlet openings 22*b* and a corresponding manifold 22*b*' through a plurality of cathode waste gas flow passages 42*b* (not shown); and coolant inlet openings 28*b* and a corresponding manifold 28*b*' which are in flow communication with coolant outlet openings 26*b* and a corresponding manifold 26*b*' through a plurality of internal coolant flow passages 30*b* (not shown).

The second stack 66 of plates 10 is structurally identical to the fuel cell stack 62 except that partition members 60 are not in the form of electrolytic membranes. Rather, the partition members 60 preferably comprise heat transmissive partitions which allow heat transfer from the relatively hot cathode waste gas flowing through passages 42*b* and the relatively cool anode reactant gas flowing through passages 32*b*. The heat transmissive partitions are optionally water permeable to permit transfer of water from the relatively humid cathode waste gas to the relatively dry anode reactant gas, thereby providing humidification of the anode reactant gas.

As mentioned above, the end plates 68, 70 of first heat exchanger 64 comprise simple apertured plates having inlet and outlet openings which align with selected inlet and outlet manifolds of the second stack 66. In particular, the outer end plate 68 permits the anode reactant gas to enter the heat exchanger 64, and therefore has an anode reactant gas opening 72 which is aligned with and in flow communication with the anode reactant gas inlet manifold 20*b*' of the first heat exchanger 64. In order to allow removal of the cathode waste gas from the fuel cell assembly, the outer end plate 68 is provided with a cathode waste gas opening 74 which is aligned with and in flow communication with the cathode waste gas outlet manifold 22*b*' of the first heat exchanger 64. Lastly, to permit the coolant to exit the fuel cell assembly, the outer end plate 68 is provided with a coolant opening 76 which is aligned with and in flow communication with the coolant outlet manifold 26*b*' of the first heat exchanger 64. It will be appreciated that the outer end plate 68 seals the outer ends of the other three manifolds of heat exchanger 64, namely the cathode waste gas inlet manifold 24*b*', the coolant inlet manifold 28*b*' and the anode reactant gas outlet manifold 18*b*'. It will be appreciated that the outer end plate 68 may be provided with fittings, or with means for connection to fittings, which permit connection to conduits (not shown) for carrying gases and coolants to and from the fuel cell assembly.

The inner end plate 70 also has three openings and may be similar or identical in structure to the outer end plate 68. In order to permit flow of the anode reactant gas from heat exchanger 64 to fuel cell stack 62, the inner end plate 70 has an anode reactant gas opening 78 which provides flow communication between the anode reactant gas outlet manifold 18*b*' of the first heat exchanger 64 and the anode reactant gas inlet manifold 18*a*' of the fuel cell stack 62. In order to permit flow of the cathode waste gas from the fuel cell stack 62 to heat exchanger 64, the inner end plate 70 is provided with a cathode waste gas opening 80 which is aligned with and provides flow communication between the cathode waste gas inlet manifold 24*b*' of first heat exchanger 64 and the cathode waste gas outlet manifold 24*a*' of the fuel cell stack 62. Lastly, in order to permit the coolant to flow between the fuel cell stack 62 and the heat exchanger 64, the inner end plate 70 is provided with a coolant opening 82 which is aligned with and provides flow communication between the coolant outlet manifold 28*a*' of fuel cell stack 62 and the coolant inlet manifold 28*b*' of the heat exchanger 64. The inner end plate 70 seals the inner ends of the anode reactant gas inlet manifold 20*b*', the cathode waste gas outlet manifold 22*b*' and the coolant outlet manifold 26*b*' of the first heat exchanger, and thereby prevents flow communication with manifolds 20*a*', 22*a*' and 26*a*' of the fuel cell stack 62.

It may be preferred that the fuel cell assembly according to the first embodiment of the invention is also provided with a second reactant conditioning heat exchanger 84 for heating and optionally humidifying the second reactant gas. In the embodiment shown in the drawings, the second reactant gas is the cathode reactant gas. Therefore, the second heat exchanger 84 is a cathode reactant gas conditioning heat exchanger 84 for heating and optionally humidifying an oxygen-containing cathode gas before it enters the fuel cell stack 62.

The second heat exchanger 84 is comprised of a third stack 86 of plates 10. For the purpose of distinguishing the plates 10 of second heat exchanger 84 from other plates of the fuel cell assembly, they are referred to in the following description, and in the drawings, by reference 10*c*. The openings of plates 10*c* are referred to as 18*c*, 20*c*, 22*c*, 24*c*, 26*c* and 28*c* and the corresponding manifolds are referred to as 18*c*', 20*c*', 22*c*', 24*c*', 26*c*' and 28*c*'. As more fully explained below, the naming of the openings and manifolds of plates 10*c* of the second heat exchanger 84 differs from that of plates 10*a* and 10*b*.

The second heat exchanger 84 also comprises a pair of end plates 88, 90 between which the second stack 86 of plates 10*c* is sandwiched. Outer end plate 88 is provided at an outer end of the third stack 86, distal to the fuel cell stack 62, and inner end plate 90 is provided at an inner end of the third stack 86, between the fuel cell stack 62 and the third stack 86. The end plates 88 and 90 of the second heat exchanger 84 are preferably structurally identical to one another and to the end plates 68, 70 of the first heat exchanger 64. The end plates 88, 90 are preferably flat, apertured plates without internal or external flow passages, each having three openings as further described below The end plates 88, 90 have perimeters which closely follow those of the plates making up the fuel cell stack 62 and the first heat exchanger 64.

The plates 10*c* forming the second heat exchanger 84 are preferably identical in structure to the plates 10, 10*a* and 10*b* described above. However, due to the fact that the primary purpose of heat exchanger 84 is to condition the cathode gas before it enters the fuel cell stack 62, the functions of the openings and manifolds in the second heat exchanger 84 differ somewhat from those of fuel cell stack 62 and first heat exchanger 64. Accordingly, the names of the various openings, manifolds and flow passages of plates 10c in stack 86 differ somewhat from those of fuel cell stack 62 and first heat exchanger 64. The plates 10c and stack 86 of second heat exchanger 84 include the following: cathode reactant gas inlet openings 24c and a corresponding manifold 24c' which are in flow communication with the cathode reactant gas outlet openings 22c and a corresponding manifold 22c' through a plurality of cathode reactant gas flow passages 42c; anode waste gas outlet openings 20c and a corresponding manifold 20c' which are in flow communication with the anode waste gas outlet openings 18c and a corresponding manifold 18c' through a plurality of anode waste gas flow passages 32c; and coolant inlet openings 28c and a corresponding manifold 28c' which are in flow communication with coolant outlet openings 26c and a corresponding manifold 26c' through a plurality of coolant flow passages 30c (not shown).

As in the first heat exchanger 64, the partition members 60 of the third stack 86 are not in the form of electrolytic membranes. Rather, the partition members 60 preferably comprise heat transmissive partitions which allow heat transfer from the relatively hot anode waste gas flowing through passages 32c and the relatively cool cathode reactant gas flowing through passages 42c. The heat transmissive partitions are optionally water permeable to permit transfer of water from the relatively humid anode waste gas to the relatively dry cathode reactant gas, thereby providing humidification of the cathode reactant gas.

As mentioned above, the end plates 88 and 90 of the second heat exchanger 84 comprise simple apertured plates having inlet and outlet openings which align with selected inlet and outlet manifolds of the third stack. In particular, the outer end plate 88 permits the anode waste gas to leave the heat exchanger 84, and therefore has an anode waste gas opening 92 which is aligned with and in flow communication with the anode waste gas outlet manifold 18c' of the second heat exchanger 84; a cathode reactant gas opening 94 aligned with and in flow communication with the cathode reactant gas inlet manifold 24c' of the second heat exchanger 84; and a coolant opening 96 aligned with and in flow communication with the coolant inlet manifold 28c' of the second heat exchanger 84. Thus, the outer end plate 88 permits coolant and cathode reactant gas to enter fuel cell assembly and permits anode waste gas to leave the fuel cell assembly. It will be appreciated that the outer end plate 88 seals the outer ends of the other three manifolds of heat exchanger 84, namely the anode waste gas outlet manifold 20c', the cathode reactant gas outlet manifold 22c' and the coolant outlet manifold 26c'. The outer end plate 88 may be provided with fittings or with means for connection to fittings to permit connection to conduits (not shown) for carrying gases and coolant to and from the fuel cell assembly.

The inner end plate 90 also has three openings and may be similar or identical in structure to the outer end plate 88. In order to permit flow of the cathode reactant gas from heat exchanger 84 to fuel cell stack 62, the inner end plate 90 has a cathode reactant gas opening 98 which is aligned with and provides flow communication between the cathode reactant gas outlet manifold 22c' of the third stack 86 and the cathode reactant gas inlet manifold 22a' of the fuel cell stack 62; an anode waste gas opening which is aligned with and provides flow communication between the anode waste gas inlet manifold 20c' of the third stack 86 and the anode waste gas outlet manifold 20a' of the fuel cell stack 62; and a coolant opening 102 which is aligned with and provides flow communication between the coolant outlet manifold 26c' of the third stack 86 and the coolant inlet manifold 26a' of the fuel cell stack 62. The inner end plate 90 seals the inner ends of the other three manifolds (18c', 24c' and 28c') as well as manifolds 18a', 24a' and 28a' of the fuel cell stack 62.

The flow paths of the anode reactant and waste gases, the cathode reactant and waste gases and the coolant through the fuel cell assembly are illustrated in FIGS. 8 to 11. FIG. 8 illustrates the entry and exit points for the anode and cathode gases and the coolant. FIGS. 9 to 11 illustrate in more detail the flow paths followed by the anode gas, cathode gas and the coolant as they flow through the fuel cell assembly according to the first embodiment of the invention.

It will be appreciated that the relative positions of the anode and cathode reactant gas conditioning heat exchangers 64 and 84 can be reversed, and/or that the direction of the coolant flow through the fuel cell assembly can also be reversed. In particular, the coolant can be made to enter the fuel cell assembly through the anode reactant gas conditioning heat exchanger and exit the fuel cell assembly through the cathode reactant gas conditioning heat exchanger. This is described in greater detail below with reference to a variant of the first embodiment illustrated in FIG. 12. The fuel cell assembly shown in FIG. 12 comprises a fuel cell stack 62 identical to that described above, comprised of a first plurality of plates 10a. The fuel cell assembly of FIG. 12 further includes a first heat exchanger 104 located at a first end of the fuel cell stack 62 and a second heat exchanger 106 located at a second, opposite end of the fuel cell stack 62.

The first heat exchanger 104 comprises a second stack 66 of plates 10b, identical to stack 66 of heat exchanger 64, as well as an outer end plate 108 and an inner end plate 116. The outer end plate 108 has a coolant opening 110 which is aligned with and in flow communication with the coolant inlet manifold 28b' of the second stack 66; an anode reactant gas opening 112 which is aligned with and in flow communication with the anode gas inlet manifold 20b' of the second stack 66; and a cathode waste gas opening 114 which is aligned with and in flow communication with the cathode waste gas outlet manifold 22b' of the second stack 66. The inner end plate 116 has three openings as follows a coolant opening 118 which is aligned with and provides flow communication between the coolant outlet manifold 26b' of second stack 66 and the coolant outlet manifold 26a' of the fuel cell stack 62; an anode reactant gas opening 120 which is aligned with and provides flow communication between the anode reactant gas outlet manifold 18b' of second stack 66 and anode reactant gas inlet manifold 18a' of the fuel cell stack 62; and a cathode waste gas opening 122 which is aligned with and provides flow communication between the cathode waste gas inlet manifold 24b' of second stack 66 and the cathode waste gas outlet manifold 24a' of fuel cell stack 62.

The second heat exchanger 106 shown in FIG. 12 comprises a third stack 86 of plates 10c and is structurally identical to stack 86 described in connection with FIG. 6. The second heat exchanger 106 further comprises an outer end plate 124 and an inner end plate 132.

The outer end plate 124 of the second heat exchanger 106 includes the following openings: a coolant opening 126 which is aligned with and in flow communication with the coolant outlet manifold 26c' of third stack 86; an anode waste gas opening 128 which is aligned with and in flow communication with the anode waste gas outlet manifold 18c' of third stack 86; and a cathode reactant gas opening 130 which is aligned with and in flow communication with the cathode reactant gas inlet manifold 24c' of third stack 86.

The inner end plate 132 of the second heat exchanger 106 has the following openings: a coolant opening 134 which is aligned with and provides flow communication between the coolant inlet manifold 28c' of third stack 86 and the coolant outlet manifold 28a' of fuel cell stack 62; an anode waste gas opening 136 which is aligned with and provides flow communication between the anode waste gas inlet manifold 20c' of third stack 86 and the anode waste gas outlet manifold 20a' of the fuel cell stack 62; and a cathode reactant gas opening 138 which is aligned with and provides flow communication between the cathode reactant gas outlet manifold 22c' of third stack 86 and the cathode reactant gas inlet manifold 22a' of the fuel cell stack 62.

The flow of the anode and cathode gases through the fuel cell assembly of FIG. 12 is exactly the same as that through the fuel cell assembly of FIG. 7. The coolant flow, however, is reversed, entering the fuel cell assembly of FIG. 12 through the anode reactant gas conditioning heat exchanger 104 and exiting the fuel cell assembly through the cathode reactant gas conditioning heat exchanger 106. The direction of flow of coolant through the individual plate stacks 62, 66 and 86 of the fuel cell assembly of FIG. 12 is the same as the direction of flow of the anode and cathode gases, as is preferred for optimal heat transfer.

Figure 13:
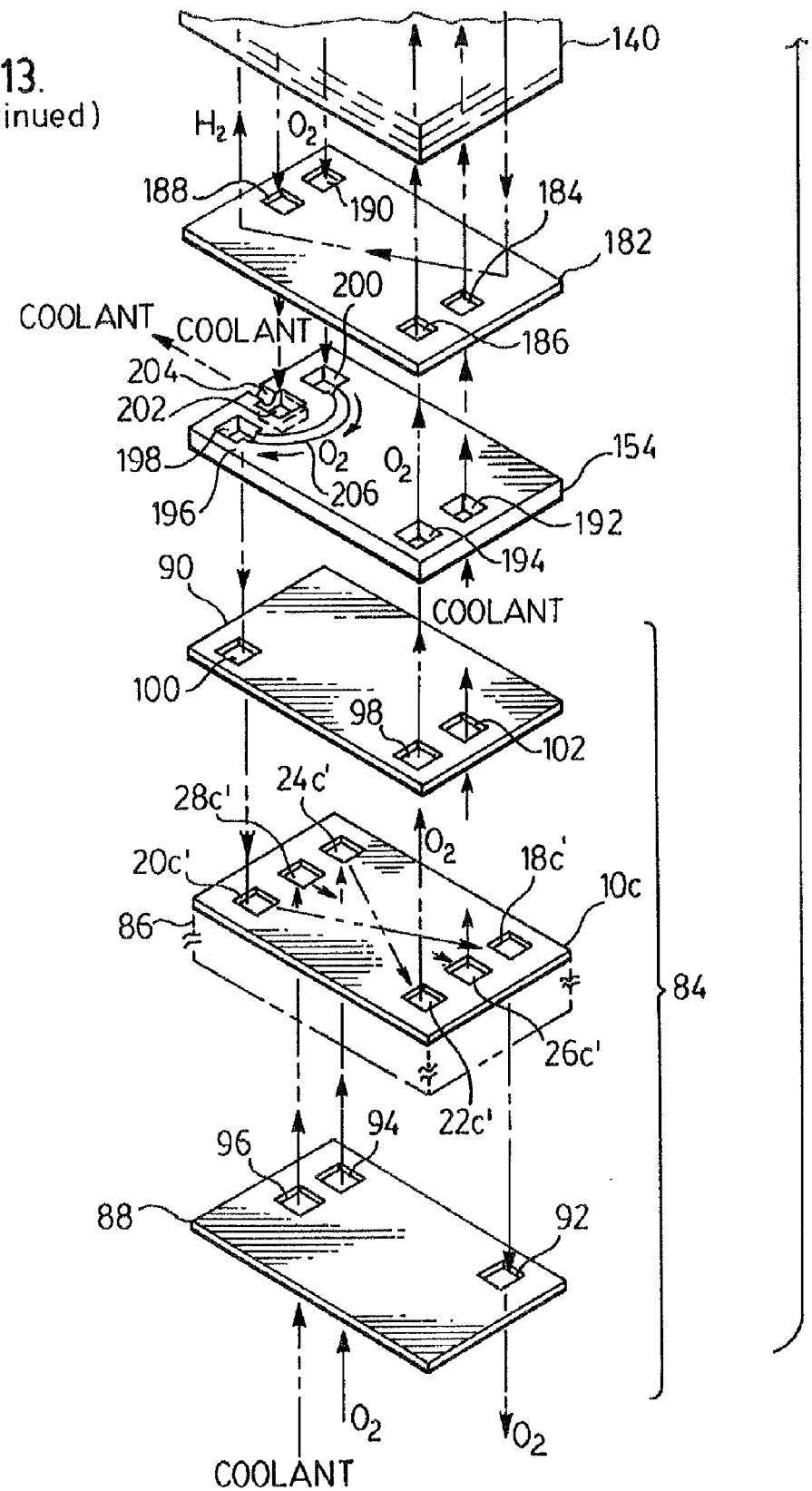
FIG. 13 is a schematic, exploded view of a fuel cell assembly according to a second embodiment of the invention.

FIG. 13 illustrates a second preferred fuel cell assembly according to the present invention which, like the fuel cell assemblies described above, preferably also comprises a fuel cell stack positioned between two reactant gas conditioning heat exchangers. More particularly, the fuel cell assembly of FIG. 13 includes a fuel cell stack 140, a first heat exchanger 104 provided at a first end of the fuel cell stack and a second heat exchanger 84 provided at a second end of the fuel cell stack. The fuel cell assembly according to the second embodiment differs in a number of respects from the fuel cell assemblies of the first embodiment described above. Firstly, the anode reactant gas is conditioned by the anode waste gas in the first heat exchanger 104, rather than by the cathode waste gas as in the first embodiment. Secondly, the cathode reactant gas is conditioned by the cathode waste gas in the second heat exchanger 84, rather than by the anode waste gas as in the first embodiment. Thirdly, the coolant does not enter one end of the fuel cell assembly and exit from other end as in the first embodiment. Rather, the fuel cell assembly according to the second embodiment includes two separate coolant loops, each one defining a coolant flow path through one of the heat exchangers 104, 84 and a portion of the fuel cell stack 140. Thus, in the second embodiment shown in FIG. 13, the flow of relatively hot coolant from the fuel cell stack to one of the heat exchangers is avoided. In order to provide the above features, the fuel cell assembly of FIG. 13 comprises a number of additional structural elements which are not present in the fuel cell assemblies according to the first embodiment.

The first heat exchanger 104 of the fuel cell assembly of FIG. 13 is structurally identical to the first heat exchanger 104 of the fuel cell assembly shown in FIG. 11. In terms of function, heat exchanger 104 of FIG. 13 differs only in that the anode waste gas is circulated through the heat exchanger 104 of FIG. 13, rather than the cathode waste gas as in FIG. 12. Thus, the description of manifolds and openings in the heat exchanger 104 of FIG. 12 applies to FIG. 13, with the exception that opening 114 in outer end plate 108 is an anode waste gas opening, manifolds 22b' and 24b' in the second stack 66 are an anode waste gas outlet manifold and an anode waste gas inlet manifold, respectively; and opening 122 in the inner end plate 116 is an anode waste gas opening.

Similarly, the second heat exchanger 84 of FIG. 13 is structurally identical to heat exchanger 84 of FIG. 7, and is functionally identical except that the cathode waste gas flows through the heat exchanger 84 of FIG. 13 rather than the anode waste gas. Thus, in FIG. 13, opening 100 in the inner end plate 90 is a cathode waste gas opening, manifolds 20c' and 18c' are cathode waste gas inlet manifold and a cathode waste gas outlet manifold, respectively; and opening 92 of outer end plate 88 is a cathode waste gas opening.

The fuel cell assembly of FIG. 13 further comprises a first coolant redirecting plate 142 located within the fuel cell stack 140 to divide the fuel cell stack into a first portion 140a through which a first portion of the coolant circulates and a second portion 140b through which a second portion of the coolant circulates. In the embodiment shown in FIG. 13, the first coolant redirecting plate 142 is located approximately midway through the fuel cell stack 140. It will be appreciated that this is not necessarily the case. The first portion 140a of the fuel cell stack 140 is located proximate to the first heat exchanger 104 and receives coolant from the first heat exchanger, and the second portion 140b of the fuel cell stack 140 is distal to the first heat exchanger 104 and proximate to the second heat exchanger 84, and receives coolant from the second heat exchanger 84.

The first coolant redirecting plate 142 preferably comprises a flat, apertured plate similar in structure to the inner and outer end plates of the heat exchangers 104, 84, except that it has four openings instead of three. The plate 142 does not affect the flow of the reactant and waste gases through the stack, and therefore includes an anode reactant gas opening 144, a cathode reactant gas opening 146, an anode waste gas opening 148 and a cathode waste gas opening 150. The anode reactant gas opening 144 is in alignment with the openings 18a of plates 10a making up the anode reactant gas inlet manifold 18a' of fuel cell stack 140. The cathode reactant gas opening 146 is in alignment with the openings 22a of plates 10a which make up the cathode reactant gas inlet manifold 22a' of fuel cell stack 140. The anode waste gas opening 148 of plate 142 is in alignment with the openings 20a of plates 10a which make up the anode waste gas outlet manifold 20a' of fuel cell stack 140. The cathode waste gas opening 150 of plate 142 is aligned with the openings 24a of plates 10a which make up the cathode waste gas outlet manifold 24a' of fuel cell stack 140. In this way, the inlet manifolds 18a' and 22a' for the anode and cathode reactant gases, as well as the outlet manifolds 20a' and 24a' for the anode and cathode waste gases, extend through the entire fuel cell stack 140.

The first coolant redirecting plate 142 does not, however, have openings for coolant, thereby providing a barrier which divides each of the coolant inlet manifold 26a' and coolant outlet manifold 28a' of fuel cell stack 140 into two portions. Thus, plate 142 prevents flow of coolant through the fuel cell stack and provides separation between the two coolant loops.

Once the coolant circulates through a portion of the fuel cell stack 140, it is forced to exit the same portion of the fuel cell stack 140 and must exit the fuel cell assembly without making a second pass through one of the heat exchangers 104, 84. For this reason, additional coolant redirecting plates are provided to permit the coolant to exit the fuel cell assembly without re-entering the heat exchanger through which it first entered the fuel cell assembly. As shown in FIG. 13, a second coolant redirecting plate 152 is provided for the purpose of allowing a first portion of the coolant to exit the fuel cell assembly without making a second pass through the first heat exchanger 104. Similarly, a third coolant redirecting plate 154 is provided for the purpose of permitting a second portion of the coolant to exit the fuel cell assembly without making a second pass through the second heat exchanger 84.

The second coolant redirecting plate 152 is a flat, apertured plate which is interposed between the first heat exchanger 104 and the fuel cell stack 140, and has a plurality of openings. Plate 152 comprises a first coolant opening 162 which is aligned with, and in flow communication with, the coolant opening 118 of the inner end plate 116 of the first heat exchanger 104, the coolant outlet manifold 26b' of the first heat exchanger 104, and the coolant inlet manifold 26a' in the first portion 140a of the fuel cell stack 140. Plate 152 further comprises a second coolant opening 158 which is aligned with, and in flow communication with, the coolant outlet manifold 28a' of the first portion 140a of the fuel cell stack 140. The second coolant redirecting plate further comprises a coolant outlet opening 160 extending through a side surface of plate 152 to provide flow communication between the second coolant opening 158 and an outer edge of the plate 152, through which the first portion of the coolant exits the fuel cell assembly.

It will be appreciated that the thickness of plate 152 may be greater than the thickness of the end plates of the heat exchangers due to the provision of the coolant opening 160 in the side surface of plate 152. It will also be appreciated that the second coolant opening 158 of plate 152 may extend completely through the plate 152, being closed off on one side by the inner end plate 116 of the first heat exchanger 104. Alternatively, the opening 158 may be a blind opening which is closed off at the upper surface of plate 152. Either way, flow of coolant is prevented between the second coolant opening 158 of redirecting plate 152 and the coolant inlet manifold 28b' of the first heat exchanger 104.

The second coolant redirecting plate 152 further provides openings through which the anode reactant gas and anode waste gas are permitted to pass between the first heat exchanger 104 and the fuel cell stack 140. For this purpose, the second coolant redirecting plate 152 is provided with an anode reactant gas opening 156 which is aligned with, and provides flow communication between, the anode reactant gas outlet manifold 18b' of the first heat exchanger 104 and the anode reactant gas inlet manifold 18a' of the fuel cell stack 140.

The second coolant redirecting plate 152 is also provided with an anode waste gas opening 164 which is aligned with, and provides flow communication between the anode waste gas outlet manifold 20a' of fuel cell stack 140 and the anode waste gas inlet manifold 24b' of the first heat exchanger 104. It will be noted that the anode waste gas outlet manifold 20a' of fuel cell stack 140 and the anode waste gas inlet manifold 24b' of first heat exchanger 104 are not in direct axial alignment with each other. Therefore, the anode waste gas opening 164 of the second coolant redirecting plate 152 is in the form of a "crossover opening", including a first opening 166 which is aligned with, and in flow communication with, the anode waste gas outlet manifold 20a' of fuel cell stack 140, a second opening 168 which is aligned with, and in flow communication with, the anode waste gas inlet manifold 24b' of heat exchanger 104, and a crossover channel 170 which permits the anode waste gas to flow between the two openings 166, 168.

In order to perform the required crossover function, it will be appreciated that the opening 166 must be closed on the side of plate 152 which is distal to the fuel cell stack 140, and that opening 168 must be closed on the side of plate 152 which is proximal to the fuel cell stack 140. It will also be appreciated that the crossover channel 170 must be closed on both the distal and proximal sides of the plate 152. As in the case of the opening 158 described above, the plate 152 can be constructed so that the openings 166, 168 and channel 170 extend completely through the plate 152, or they may comprise blind openings closed on the distal and/or proximal sides of plate 152. Where the openings 166, 168 and channel 170 extend completely through plate 152, as shown in FIG. 13, it will be appreciated that the first opening 166 is closed by the inner end plate 116 of the first heat exchanger 104. In order to close the proximal end of opening 168, however, an intermediate plate 172 is provided between the second coolant redirecting plate 152 and the fuel cell stack 140. The intermediate plate 172 has a plurality of flowthrough openings as follows: an anode reactant gas opening 174 aligned with, and providing flow communication between, the anode reactant gas outlet manifold 18b' of first heat exchanger 104 and the anode reactant gas inlet manifold 18a' of fuel cell stack 140; a first coolant opening 176 which is aligned with, and provides flow communication between, the coolant outlet manifold 26b' of the first heat exchanger 104 and the coolant inlet manifold 26a' in the first portion 140a of fuel cell stack 140; an anode waste gas opening 178 which is aligned with, and provides flow communication between, the anode waste gas outlet manifold 20a' of the fuel cell stack 140 and the anode waste gas inlet opening 164 in second coolant redirecting plate 152; and a second coolant opening 180 which is aligned with, and provides flow communication between, the coolant outlet manifold 28a' in the first portion 140a of the fuel cell stack 140 and the second coolant opening 158 of the second coolant redirecting plate 152.

It will be appreciated that the intermediate plate 172 may be eliminated if the opening 168 is a blind opening which is closed at the proximal surface of the plate 152. The end plate 116 of heat exchanger 104 could likewise be eliminated if the opening 164 is configured as a blind opening which is closed at the distal surface of the plate 152. Optionally, one or both of plates 116 and 172 could be eliminated by configuring the openings 164, 168 as blind openings in the manner described above.

Figure 19:
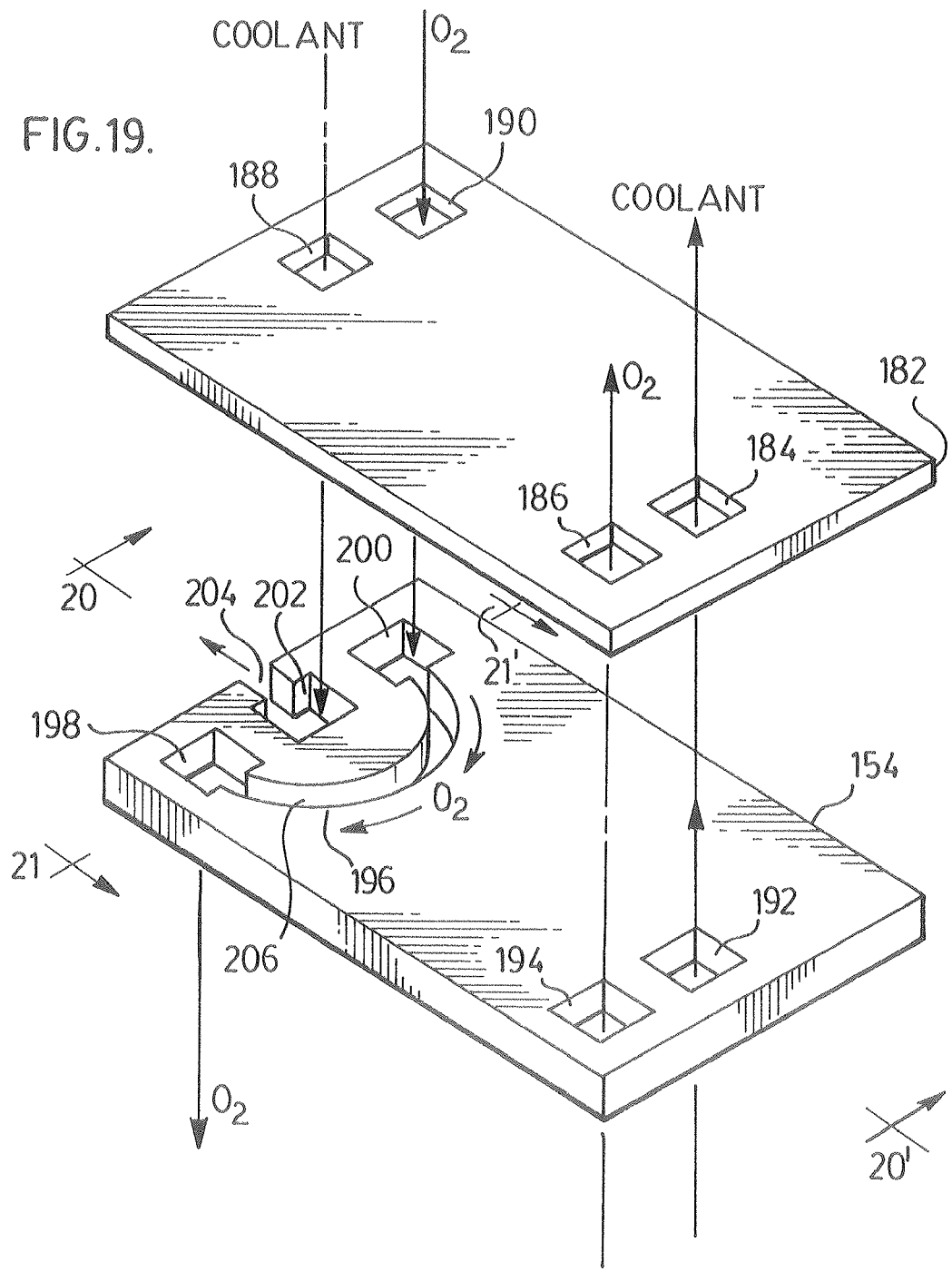
FIG. 19 is a close-up of the third coolant redirecting plate and the second intermediate plate in the embodiment of FIG. 13.
Figure 20:
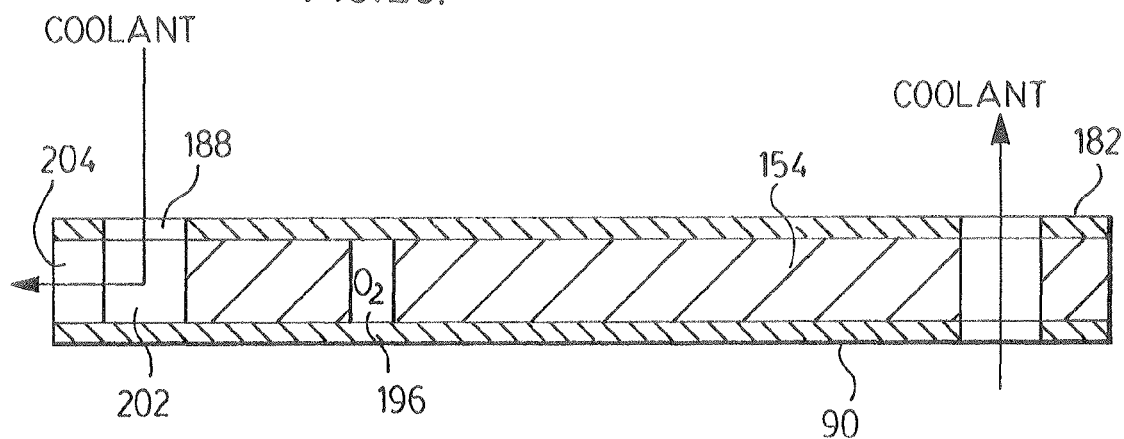
FIG. 20 is a longitudinal cross section along line 20-20' of FIG. 19.
Figure 21:
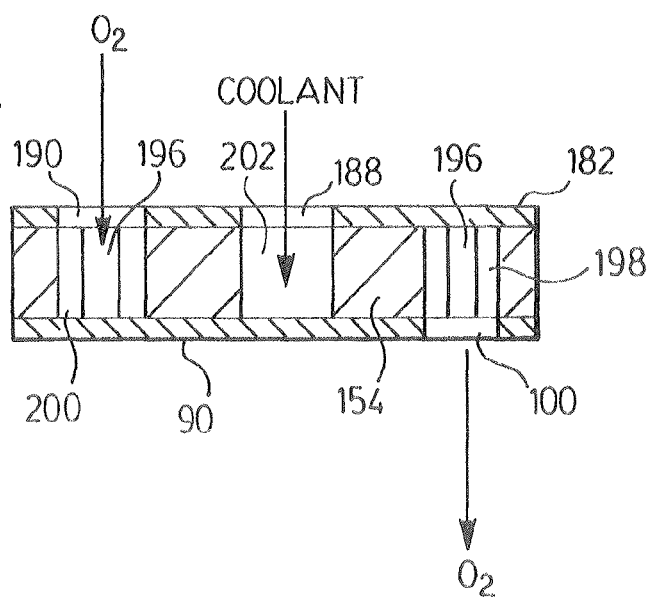
FIG. 21 is a transverse cross section along line 21-21' of FIG. 19.

As mentioned above, the fuel cell assembly of FIG. 13 also incorporates a third coolant redirecting plate 154 which corresponds in structure and function to the second coolant redirecting plate 152 described above. The plate 154 has a first coolant opening 192, a second coolant opening 202 in communication with a coolant outlet opening 204 extending through the side surface of the plate 154, a cathode reactant gas opening 194 and a cathode waste gas opening 196. The opening 196 is in the form of a crossover opening, including a first opening 200 which receives the cathode waste gas from the stack 140, a second opening 198 which permits the cathode waste gas to flow through heat exchanger 84, and a crossover channel 206 which permits the cathode waste gas to flow transversely between the two openings 200, 198. Plate 154 is positioned between the second heat exchanger 84 and the fuel cell stack 140 to provide an outlet for the coolant flowing through the second portion 140b of the fuel cell stack 140. A second intermediate plate 182 corresponding in structure to plate 172 described above may be provided in order to allow crossover of the cathode waste gas and to prevent flow communication between the cathode waste gas inlet manifold 20c' of the second heat exchanger 84 and the anode waste gas outlet manifold 20a' of the fuel cell stack 140. The second intermediate plate 182 has a plurality of flow-through openings as follows: a first coolant opening 184 which is aligned with coolant opening 192 of plate 154; a cathode reactant gas opening 186 aligned with opening 194 of plate 154; a second coolant opening 188 aligned with coolant opening 202 of plate 154; and a cathode waste gas opening 190 which is aligned with opening 200 of the crossover opening 196 of plate 154. Close-up views of plates 154 and 182 are shown in FIGS. 19-21. FIGS. 20 and 21 show the third coolant redirecting plate 154 sandwiched between the second intermediate plate 182 and the inner end plate 90 of heat exchanger 84. It will be seen from FIGS. 20 and 21 that the third coolant redirecting plate 154 could be integrally formed with one or both of plates 90 and 182 in order to reduce the number of components making up the fuel cell assembly.

Figure 14:
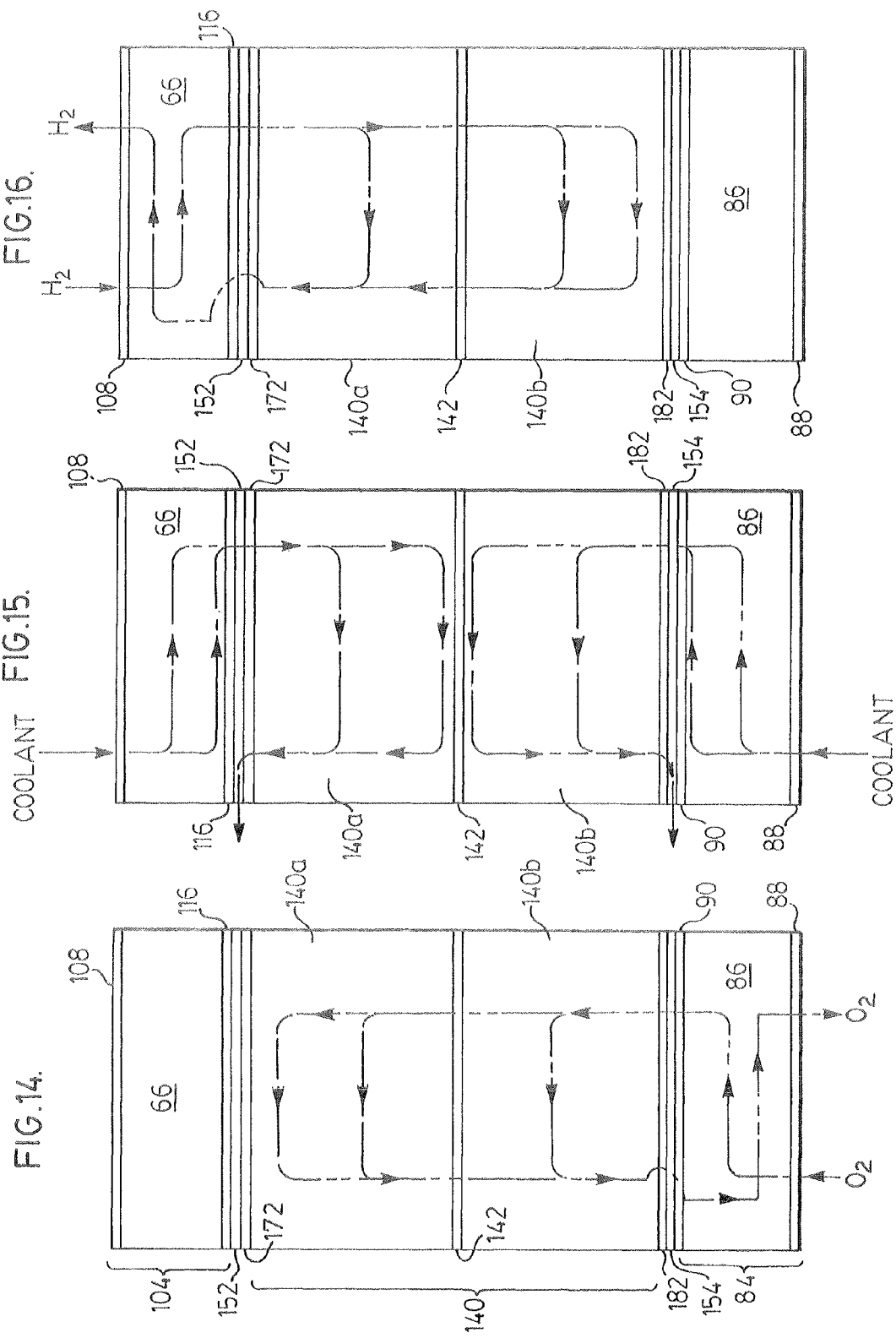
FIG. 14 is a cross section through the fuel cell assembly of FIG. 13, illustrating the cathode gas (oxygen) flow path.
Figure 15:
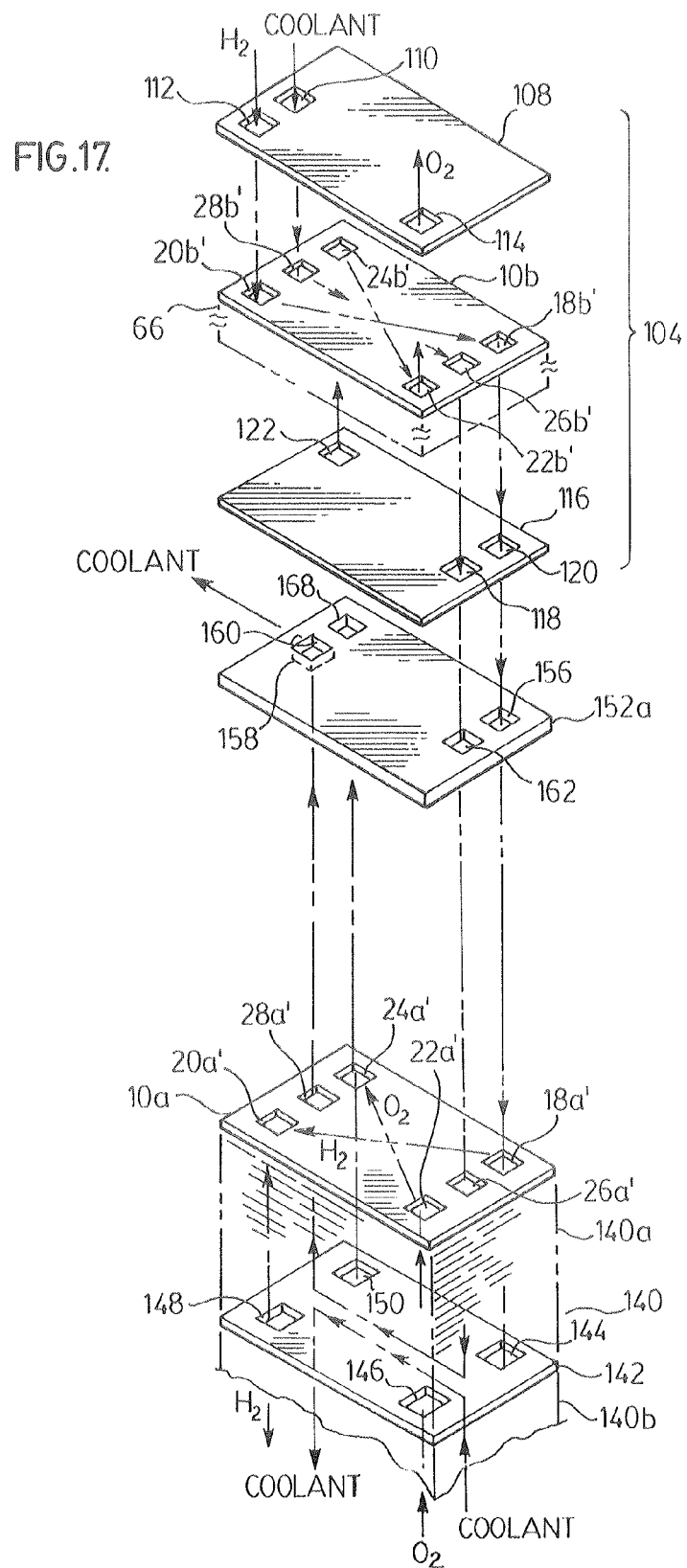
FIG. 15 is a cross section through the fuel cell assembly of FIG. 13, showing the coolant flow path.
Figure 16:
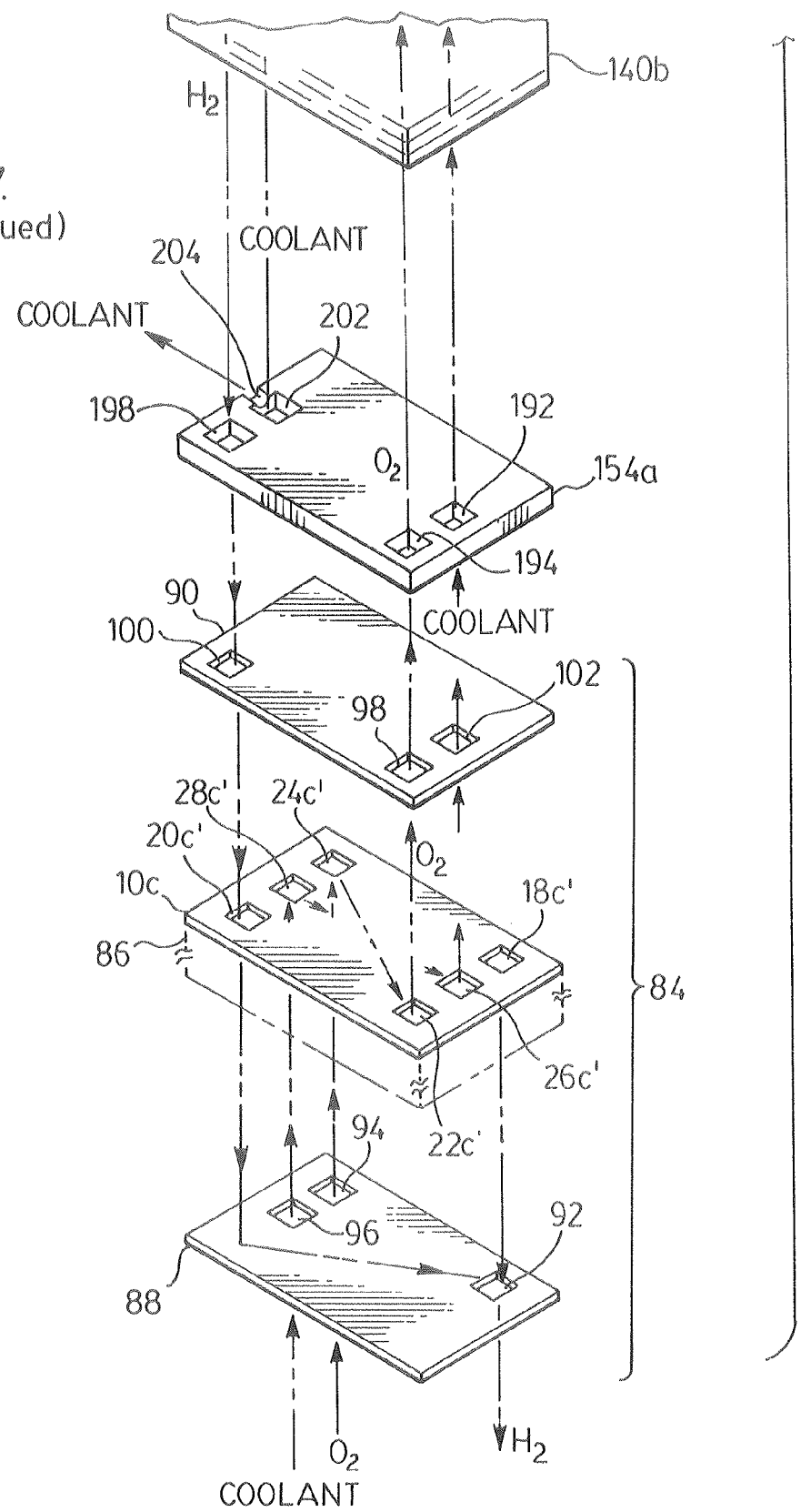
FIG. 16 is a cross section through the fuel cell assembly of FIG. 13, showing the anode gas (hydrogen) flow path.

FIGS. 14 to 16 illustrate in more detail the flow paths followed by the anode gas, cathode gas and the coolant as they flow through the fuel cell assembly according to the second embodiment of the invention illustrated in FIG. 13.

It will be appreciated that the provision of multiple coolant loops and the recirculation of the anode and cathode gases in the second embodiment of the invention are two separate functions which are not necessarily embodied in a single fuel cell assembly. In a first variant of the second embodiment, illustrated in FIG. 17, multiple coolant loops are provided as in FIG. 13, but the anode and cathode gases flow through the entire fuel cell assembly from one end to the other as in the first embodiment of the invention described above.

Figure 17:
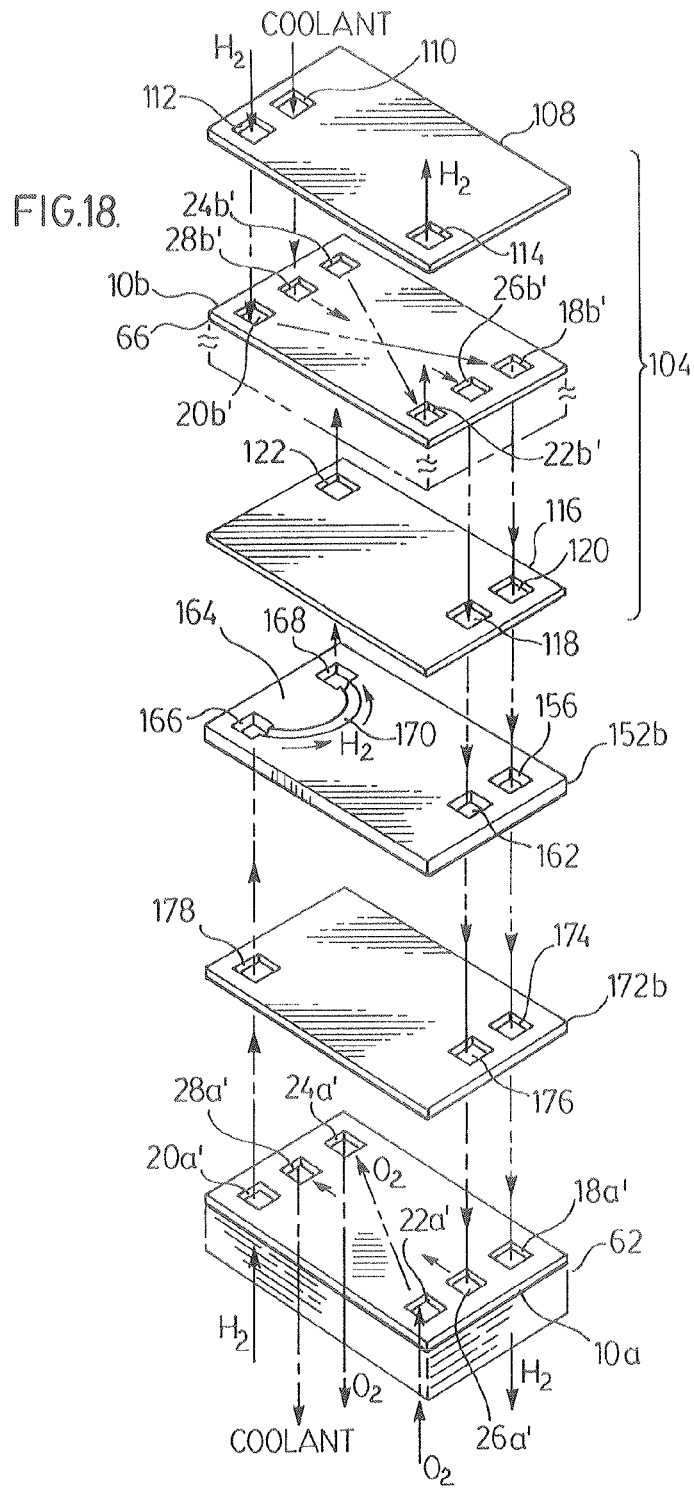
FIG. 17 is a schematic, exploded view of a fuel cell assembly according to a first variant of the second embodiment.

FIG. 17 illustrates a fuel cell assembly comprising a fuel cell stack 140, a first heat exchanger 104 and a second heat exchanger 84, all of which have already been described above in detail. It will be seen from FIG. 17 that the anode reactant gas enters the assembly through heat exchanger 104 and the anode waste gas exits the assembly through the second heat exchanger 84. Conversely, the cathode reactant gas enters the assembly through second heat exchanger 84 and exits the assembly through first heat exchanger 104. The differences between the fuel cell assemblies of FIGS. 13 and 17 are relatively minor and are as follows. Firstly, the intermediate plates 172 and 182 are eliminated in the variant of FIG. 17, the crossover channel 170 and opening 166 of plate 152 are eliminated in corresponding plate 152a of FIG. 17, and the crossover channel 206 and opening 200 of plate 154 are eliminated in plate 154a of FIG. 17. These modifications remove elements of the second embodiment which result in re-circulation of flow of the anode and cathode gases, thereby permitting them to flow end-to-end through the heat fuel cell assembly.

Figure 18:
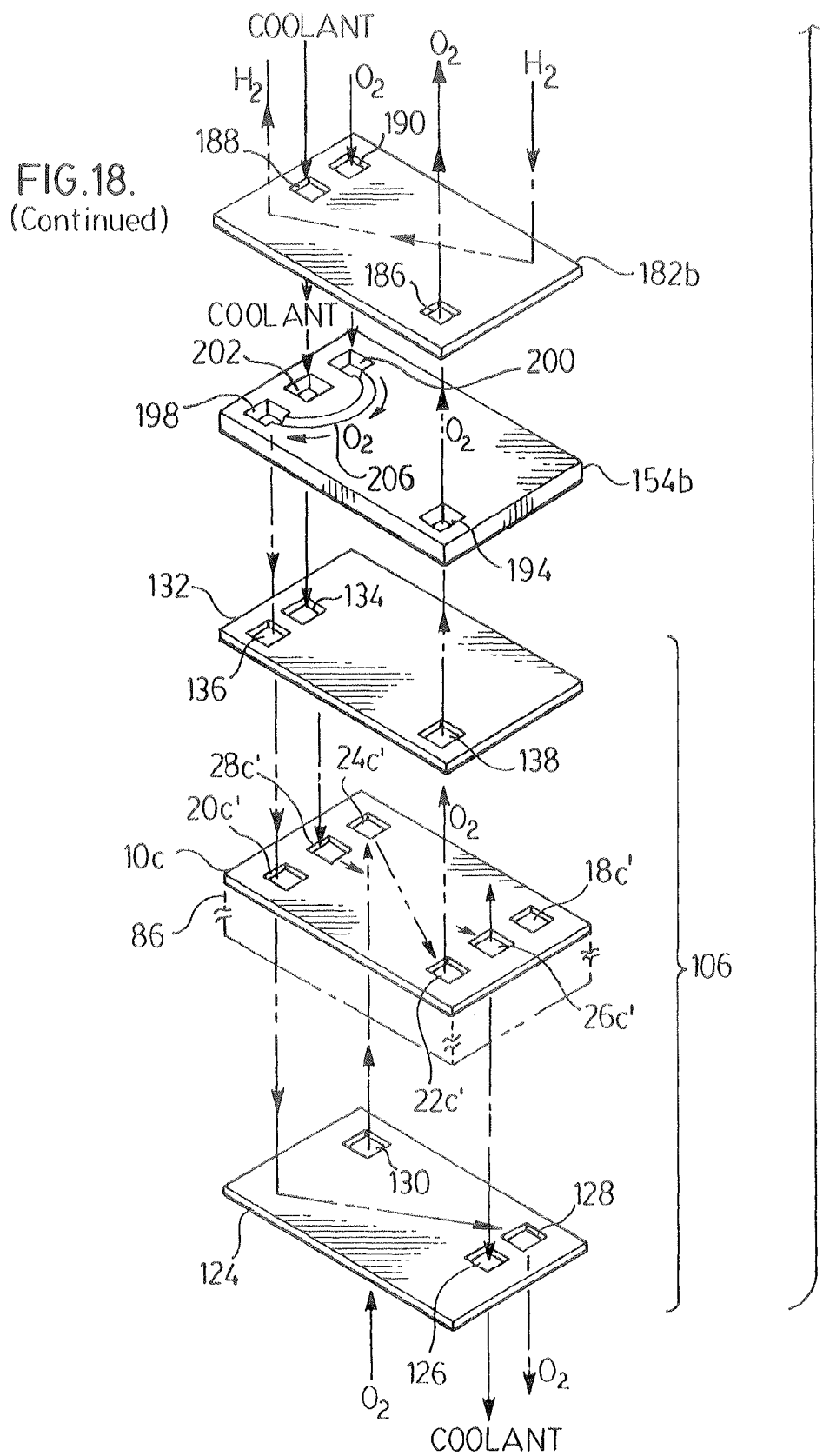
FIG. 18 is a schematic, exploded view of a fuel cell assembly according to a second variant of the second embodiment.

In a second variant of the second embodiment, illustrated in FIG. 18, the anode and cathode gases are recirculated as described above with reference to FIG. 13, but the coolant is made to flow end-to-end through the fuel cell assembly as in the first embodiment described above.

FIG. 18 illustrates a fuel cell assembly comprising a fuel cell stack 62, a first heat exchanger 104 and a second heat exchanger 106, all of which have already been described above in detail. It will be seen from FIG. 18 that the anode reactant gas enters the fuel cell assembly through the first heat exchanger 104 and is circulated through the stack 62, and is then recirculated back to the first heat exchanger 104 before leaving the fuel cell assembly. Similarly, the cathode reactant gas enters the fuel cell assembly through the second heat exchanger 106, is circulated through the stack 62, and is then recirculated back to the second heat exchanger 106 before leaving the assembly. The coolant, on the other hand, enters the fuel cell assembly through the first heat exchanger 104, circulates through the stack 62, and leaves the fuel cell assembly through the second heat exchanger 106. The differences between the fuel cell assembly shown in FIG. 18 and that shown in FIG. 13 are relatively minor, and are now discussed below.

For example, the stack 62 of FIG. 18 does not include the equivalent of a plate 142 to block flow of coolant end-to-end through the stack, nor is there any need for coolant outlet ports on the side of the fuel cell assembly. Accordingly, the variant of FIG. 18 includes plates 152b and 154b which do not have a coolant redirecting function, and therefore do not have coolant outlet ports 160, 204, and only one coolant opening rather than two. In particular, plate 152b includes coolant opening 162 but eliminates opening 158, and plate 154b includes coolant opening 202 but eliminates opening 192. Intermediate plates 172b and 182b are similarly configured to include only one coolant opening. In particular, plate 172b includes coolant opening includes coolant opening 176 but eliminates opening 180, and plate 182b includes coolant opening includes coolant opening 188 but eliminates opening 184. These modifications permit the coolant to flow end-to-end through the assembly from the heat exchanger 104 to the heat exchanger 106, with the coolant flow through the three plate stacks 66, 62 and 86 being in the same direction as the flow of the anode and cathode gases. It will be appreciated that the direction of coolant flow through the assembly can be reversed, i.e. to enter through heat exchanger 106 and exit through heat exchanger 104, by simply reversing the locations of the coolant openings in plates 152b, 154b, 172b and 182b and the end plates of the heat exchangers 104, 106, eg. in plate 108 the coolant opening 110 would be moved to the opposite end of the plate next to opening 114, etc.

It will be appreciated that numerous modifications can be made to the fuel cell assemblies described herein in order to provide various flow path configurations for the anode and cathode gases and the coolant, without departing from the scope of the invention. The fuel cell assemblies according to the invention provide a number of potential benefits, including a reduction in the size and complexity of the fuel cell assembly, as well as improved efficiency. In particular, the fuel cell assemblies described above achieve a reduction in the number of components, eg. external heat exchangers and associated conduits, which are required in the fuel cell system. Also, since the integrated heat exchangers according to the invention may utilize the same plates as used in the fuel cell stack, the number of different plate configurations used in the fuel cell system may be reduced, and placement of heat exchangers with similar dimensions at the ends of the fuel cell stack may allow space savings to be achieved. Furthermore, it will be appreciated that the fuel cell assemblies described above are preferably placed between the end plates of the fuel cell stack in a fuel cell system, wherein the end plates of the fuel cell stack may be in contact with the ambient surroundings. Thus, the integrated reactant-conditioning heat exchangers according to the invention are interposed between the fuel cell stack and the end plates of the stack. This has the effect of isolating the plates near the ends of the fuel cell stack from contact with the ambient surroundings and with the end plates. Thus, the fuel cell plates near the ends of the fuel cell stack can be more easily maintained at the same temperature as the plates located in the central portion of the stack, resulting in greater efficiency of the fuel cell system.

Although the invention has been described in relation to certain specific embodiments, it is not limited thereto. Rather, the invention includes all embodiments which fall within the scope of the following claims.

What is claimed is:

1. A fuel cell assembly comprising a fuel cell stack and a first heat exchanger, wherein a first reactant gas and a second reactant gas are reacted in said fuel cell stack to generate electrical energy and to produce a first waste gas and a second waste gas, wherein the fuel cell assembly is comprised of a plurality of plates having a first plate wall and an opposed second plate wall which are spaced apart to define a hollow interior, each of the plates having three pairs of inlet and outlet openings, including a coolant inlet opening and a coolant outlet opening which are in flow communication with one another through a coolant flow passage provided in the hollow interior of the plate;

(a) wherein said fuel cell stack comprises:

(i) a first stack of said plates in which said inlet and outlet openings further include a first reactant gas inlet opening, a first waste gas outlet opening, a second reactant gas inlet opening and a second waste gas outlet opening;

wherein the plates are arranged in the first stack with their inlet and outlet openings aligned to form a plurality of corresponding, axially extending manifolds, including a first reactant gas inlet manifold, a first waste gas outlet manifold, a second reactant gas inlet manifold, a second waste gas outlet manifold, a coolant inlet manifold and a coolant outlet manifold;

wherein adjacent pairs of said plates in the first stack are sealed to one another about their peripheries with electrolytic membranes provided between said adjacent plates, such that a first gas flow passage is defined between an outer surface of the first plate wall of each plate and one of said membranes and a second gas flow passage is defined between an outer surface of the second plate wall each plate and another one of said membranes, such that the first reactant gas inlet manifold and the first waste gas outlet manifold are in flow communication with one another through said first gas flow passages, and the second reactant gas inlet manifold and the second waste gas outlet manifold are in flow communication with one another through said second gas flow passages, and such that the first and second gas flow passages throughout the first stack are in reactive communication with one another through said electrolytic membranes; and (b) wherein said first heat exchanger is located at a first end of the fuel cell stack and comprises:

(i) a second stack of said plates, in which said inlet and outlet openings further include a first reactant gas inlet opening, a first reactant gas outlet opening, a waste gas inlet opening and a waste gas outlet opening for either the first or second waste gas;

wherein the plates are arranged in the second stack with their inlet and outlet openings aligned to form a plurality of corresponding, axially extending manifolds, including a first reactant gas inlet manifold, a first reactant gas outlet manifold, a waste gas inlet manifold, a waste gas outlet manifold, a coolant inlet manifold and a coolant outlet manifold;

wherein adjacent pairs of said plates in the second stack are sealed to one another about their peripheries with heat transmissive partitions provided between said adjacent plates, wherein a first gas flow passage is defined between an outer surface of the first plate wall of each plate and one of said partitions and a second gas flow passage is defined between an outer surface of the second plate wall of each plate and another one of said partitions, such that the first reactant gas inlet and outlet manifolds are in flow communication with one another through said first gas flow passages, and the waste gas inlet and outlet openings are in flow communication with one another through said second gas flow passages, and such that the first and second gas flow passages throughout the second stack are in heat transfer communication with one another through said partitions;

(ii) an outer end plate provided at an outer end of the second stack, distal to the first stack, the outer end plate having a first reactant gas opening in flow communication with the first reactant gas inlet manifold of the second stack, a waste gas opening in flow communication with the waste gas outlet manifold of the second stack, and a coolant opening in flow communication with either the coolant inlet or outlet manifold of the second stack, wherein the outer end plate seals an outer end of each of the waste gas inlet manifold, the first reactant gas outlet manifold and another of the coolant manifolds of the second stack; and (iii) an inner end plate provided at an inner end of the second stack and interposed between the first and second stacks, the inner end plate having a first reactant gas opening providing flow communication between the first reactant gas outlet manifold of the second stack and the first reactant gas inlet manifold of the first stack, a waste gas opening providing flow communication between the waste gas inlet manifold of the second stack and either the first or second waste gas outlet manifold of the first stack, and a coolant opening providing flow communication either between the coolant inlet manifold of the first stack and the coolant outlet manifold of the second stack or between the coolant outlet manifold of the first stack and the coolant inlet manifold of the second stack; and wherein the inner end plate seals an inner end of each of the waste gas outlet manifold, the first reactant gas inlet manifold and one of the coolant manifolds of the second stack.

2. The fuel cell assembly of claim 1, further comprising a second heat exchanger located at a second end of the fuel cell stack;

(c) wherein said second heat exchanger comprises:

(i) a third stack of said plates, in which said inlet and outlet openings further include a second reactant gas inlet opening, a second reactant gas outlet opening, a waste gas inlet opening and a waste gas outlet opening for either the first or second waste gas;

wherein the plates are arranged in the third stack with their inlet and outlet openings aligned to form a plurality of corresponding, axially extending manifolds, including a second reactant gas inlet manifold, a second reactant gas outlet manifold, a waste gas inlet manifold, a waste gas outlet manifold, a coolant inlet manifold and a coolant outlet manifold;

wherein adjacent pairs of said plates in the third stack are sealed to one another about their peripheries with heat transmissive partitions provided between said adjacent plates, wherein a first gas flow passage is defined between an outer surface of the first plate wall of each plate and one of said partitions and a second gas flow passage is defined between an outer surface of the second plate wall of each plate and another one of said partitions, such that the second reactant gas inlet and outlet manifolds are in flow communication with one another through said first gas flow passages, and the waste gas inlet and outlet openings are in flow communication with one another through said second gas flow passages, and such that the first and second gas flow passages throughout the third stack are in heat transfer communication with one another through said partitions;

(ii) an outer end plate provided at an outer end of the third stack, distal to the first stack, the outer end plate having a second reactant gas opening in flow communication with the second reactant gas inlet manifold of the third stack, a waste gas opening in flow communication with the waste gas outlet manifold of the third stack, and a coolant opening in flow communication with either the coolant inlet or outlet manifold of the third stack, wherein the outer end plate seals an outer end of each of the waste gas inlet manifold, the second reactant gas outlet manifold and another of the coolant manifolds of the third stack; and (iii) an inner end plate provided at an inner end of the third stack and interposed between the first and third stacks, the inner end plate having a second reactant gas opening providing flow communication between the second reactant gas outlet manifold of the third stack and the second reactant gas inlet manifold of the first stack, a waste gas opening providing flow communication between the waste gas inlet manifold of the third stack and either the first or second waste gas outlet manifold of the first stack, and a coolant opening providing flow communication either between the coolant inlet manifold of the first stack and the coolant outlet manifold of the third stack or between the coolant outlet manifold of the first stack and the coolant inlet manifold of the third stack; and wherein the inner end plate seals an inner end of each of the waste gas outlet manifold, the second reactant gas inlet manifold and one of the coolant manifolds of the third stack.

3. The fuel cell assembly of claim 1, wherein the second waste gas flows through the first heat exchanger in heat exchange communication with the coolant and the first reactant gas, such that the waste gas inlet and outlet openings and the second gas flow passages of the first heat exchanger are for flow of the second waste gas, and such that the waste gas opening of the inner end plate of the first heat exchanger provides flow communication between the second waste gas inlet manifold of the second stack and the second waste gas outlet manifold of the first stack.

4. The fuel cell assembly of claim 1, wherein the first waste gas flows through the first heat exchanger in heat exchange communication with the coolant and the first reactant gas, such that the waste gas inlet and outlet openings and the second gas flow passages of the first heat exchanger are for flow of the first waste gas, and such that the waste gas opening of the inner end plate of the first heat exchanger provides flow communication between the first waste gas inlet manifold of the second stack and the first waste gas outlet manifold of the first stack.

5. The fuel cell assembly of claim 1, wherein the coolant enters the fuel cell assembly through the outer end plate of the first heat exchanger, such that the coolant opening in the outer end plate is in flow communication with the coolant inlet manifold of the second stack, and the coolant opening in the inner end plate provides flow communication between the coolant inlet manifold of the first stack and the coolant outlet manifold of the second stack.

6. The fuel cell assembly of claim 1, wherein the coolant leaves the fuel cell assembly through the outer end plate of first heat exchanger, such that the coolant opening in the outer end plate is in flow communication with the coolant outlet manifold of the second stack, and the coolant opening in the inner end plate provides flow communication between the coolant outlet manifold of the first stack and the coolant inlet manifold of the second stack.

7. The fuel cell assembly of claim 1, wherein the first reactant gas comprises a hydrogen-containing anode reactant gas, the second reactant gas comprises an oxygen-containing cathode reactant gas, the first waste gas comprises an anode waste gas and the second waste gas comprises a cathode waste gas.

8. The fuel cell assembly of claim 1, wherein the first reactant gas comprises an oxygen-containing cathode reactant gas, the second reactant gas comprises a hydrogen-containing anode reactant gas, the first waste gas comprises a cathode waste gas and the second waste gas comprises an anode waste gas.

9. The fuel cell assembly of claim 1, wherein a direction of flow through the first gas flow passages, the second gas flow passages and the coolant flow passages is generally the same.

10. The fuel cell assembly of claim 2, wherein the coolant enters the fuel cell assembly through the first heat exchanger and leaves the fuel cell assembly through the second heat exchanger.

11. The fuel cell assembly of claim 1, wherein the heat transmissive partitions of the second stack comprise water-permeable membranes which permit water to pass from the waste gas flowing through the second gas flow passages to the first reactant gas flowing through the first gas flow passages.

12. The fuel cell assembly of claim 1, wherein said plates comprising the stacks are bipolar fuel cell plates.

13. The fuel cell assembly of claim 1, further comprising a first coolant redirecting plate located within the fuel cell stack to divide the fuel cell stack into a first portion through which a first portion of the coolant circulates and a second portion through which a second portion of the coolant circulates, the first portion of the fuel cell stack being located proximate to the first heat exchanger and the second portion of the fuel cell stack being distal to the first heat exchanger;

wherein the first coolant redirecting plate has a first reactant gas opening, a first waste gas opening, a second reactant gas opening and a second waste gas opening, such that the manifolds for the first and second reactant gases and the first and second waste gases extend through the entire fuel cell stack; and wherein the first coolant redirecting plate interrupts the coolant inlet and outlet manifolds of the fuel cell stack partway through the stack so as to prevent circulation of the coolant between the first and second portions of the fuel cell stack.

14. The fuel cell assembly of claim 13, wherein the first portion of the coolant enters the fuel cell assembly through the outer end plate of the first heat exchanger, such that the coolant opening in the outer end plate is in flow communication with the coolant inlet manifold of the second stack, and the coolant opening in the inner end plate provides flow communication between the coolant inlet manifold in the first portion of the first stack and the coolant outlet manifold of the second stack; and wherein the fuel cell assembly further comprises a second coolant redirecting plate which is provided between the fuel cell stack and the inner end plate of the first heat exchanger, the second coolant redirecting plate comprising:

(i) a first coolant opening which is aligned with, and in flow communication with, the coolant opening of the inner end plate of the first heat exchanger, the coolant outlet manifold of the first heat exchanger, and the coolant inlet manifold in the first portion of the fuel cell stack;

(ii) a second coolant opening which is aligned with, and in flow communication with, the coolant outlet manifold in the first portion of the fuel cell stack; and (iii) a coolant outlet opening in flow communication with the second coolant opening, through which the first portion of the coolant leaves the fuel cell assembly.

15. The fuel cell assembly of claim 4, further comprising a crossover plate which is provided between the fuel cell stack and the inner end plate of the first heat exchanger, the crossover plate comprising:
   (i) a first outer surface and an opposed second surface spaced apart from one another along the axis, wherein the first outer surface faces the inner end plate of the first heat exchanger and the second outer surface faces the fuel cell stack;
   (ii) a first waste gas inlet opening provided in the second outer surface of the crossover plate which is in flow communication with the first waste gas outlet manifold of the fuel cell stack;
   (iii) a first waste gas outlet opening provided in the first outer surface of the crossover plate which is in flow communication with the first waste gas inlet manifold of the first heat exchanger through the waste gas opening of the inner end plate; and
   (iv) an internal crossover passage extending through an interior of the crossover plate, the internal crossover passage being in flow communication with both the first waste gas inlet and outlet openings to provide crossover flow of the first waste gas between the first waste gas outlet manifold of the fuel cell stack and the first waste gas inlet manifold of the first heat exchanger.

* * * * *

UNITED STATES PATENT AND TRADEMARK OFFICE
CERTIFICATE OF CORRECTION

| | | |
|---|---|---|
| PATENT NO. | : 7,923,162 B2 | Page 1 of 1 |
| APPLICATION NO. | : 12/051402 | |
| DATED | : April 12, 2011 | |
| INVENTOR(S) | : Doug Vanderwees | |

It is certified that error appears in the above-identified patent and that said Letters Patent is hereby corrected as shown below:

Column 17:
line 27, "plate wall each plate" should read --plate wall of each plate--.

Column 19:
lines 58-59, "of first" should read --of the first--.

Signed and Sealed this
Twenty-seventh Day of March, 2012

David J. Kappos
*Director of the United States Patent and Trademark Office*